US012579579B1

(12) United States Patent
Patel et al.

(10) Patent No.: US 12,579,579 B1
(45) Date of Patent: Mar. 17, 2026

(54) COMMUNICATION SCHEMES FOR PROPERTY CLAIMS ADJUSTMENTS

(71) Applicant: Allstate Insurance Company, Northbrook, IL (US)

(72) Inventors: Jay A. Patel, Chicago, IL (US); Jennifer A. Brandmaier, Chicago, IL (US); Mark E. Faga, Evanston, IL (US); James Gillespie, Belfast (GB); Roger Horn, Arlington Heights, IL (US); Stephen Hughes, Belfast (GB); Alinawaz Ismaili, Skokie, IL (US); Daniel Koza, Hinsdale, IL (US); William Loo, Arlington Heights, IL (US); Francis Lowry, Clogher (GB)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/344,247

(22) Filed: Jun. 10, 2021

Related U.S. Application Data

(63) Continuation of application No. 16/295,243, filed on Mar. 7, 2019, now Pat. No. 11,062,397, which is a continuation of application No. 14/061,424, filed on Oct. 23, 2013, now Pat. No. 10,269,074.

(51) Int. Cl.
*G06Q 40/00* (2023.01)
*G06Q 40/08* (2012.01)

(52) U.S. Cl.
CPC .................................... *G06Q 40/08* (2013.01)

(58) Field of Classification Search
None
See application file for complete search history.

(56) References Cited

U.S. PATENT DOCUMENTS

| | | | |
|---|---|---|---|
| 5,504,674 A | 4/1996 | Chen et al. | |
| 5,736,977 A | 4/1998 | Hughes | |
| 6,759,979 B2 | 7/2004 | Vashisth et al. | |
| 7,328,183 B1 | 2/2008 | Leisle | |

(Continued)

FOREIGN PATENT DOCUMENTS

| | | |
|---|---|---|
| AU | 2012101537 A4 | 11/2012 |
| EP | 1306322 A1 | 5/2003 |

(Continued)

OTHER PUBLICATIONS

Dec. 19, 2014—(US) Non-Final Office Action—U.S. Appl. No. 14/061,441.

(Continued)

*Primary Examiner* — Chia-Yi Liu
(74) *Attorney, Agent, or Firm* — Dinsmore & Shohl LLP

(57) ABSTRACT

Systems and methods provide for an automated system for analyzing damage to insured property. An enhanced claims processing server may analyze damage associated with the insured item using photos/video transmitted to the server from a mobile device for analysis at the server in real time. Depending on network conditions, the mobile device may transfer images to the server in high definition or low definition. The server may send notifications to the mobile device to remind a user of the mobile device to capture and transfer images to the server. The server may analyze images to provide feedback to the insured user (e.g., insurance estimates).

21 Claims, 16 Drawing Sheets

(56) References Cited

U.S. PATENT DOCUMENTS

| | | | |
|---|---|---|---|
| 7,348,895 | B2 | 3/2008 | Lagassey |
| 7,403,126 | B2 | 7/2008 | Pedraza et al. |
| 7,546,219 | B2 | 6/2009 | Wilke et al. |
| 7,777,648 | B2 | 8/2010 | Smith et al. |
| 7,809,587 | B2 | 10/2010 | Dorai et al. |
| 7,827,045 | B2 | 11/2010 | Madill, Jr. et al. |
| 7,860,735 | B2 | 12/2010 | Evanitsky |
| 8,095,394 | B2 | 1/2012 | Nowak et al. |
| 8,099,356 | B2 | 1/2012 | Feinstein et al. |
| 8,200,585 | B2 | 6/2012 | Horton |
| 8,239,220 | B2 | 8/2012 | Kidd et al. |
| 8,265,963 | B1 | 9/2012 | Hanson et al. |
| 8,266,040 | B2 | 9/2012 | Segal et al. |
| 8,320,657 | B1 | 11/2012 | Burks et al. |
| 8,346,578 | B1 | 1/2013 | Hopkins, III et al. |
| 8,370,249 | B2 | 2/2013 | Lange et al. |
| 8,379,914 | B2 | 2/2013 | Nepomniachtchi et al. |
| 8,400,299 | B1 | 3/2013 | Maroney et al. |
| 8,401,233 | B2 | 3/2013 | Tedesco et al. |
| 8,401,877 | B2 | 3/2013 | Salvagio |
| 8,401,896 | B2 | 3/2013 | Wargin et al. |
| 8,412,147 | B2 | 4/2013 | Hunter et al. |
| 8,433,127 | B1 | 4/2013 | Harpel et al. |
| 8,433,588 | B2 | 4/2013 | Willis et al. |
| 8,510,196 | B1 | 8/2013 | Brandmaier et al. |
| 8,712,893 | B1 | 4/2014 | Brandmaier et al. |
| 8,756,085 | B1 | 6/2014 | Plummer et al. |
| 9,002,719 | B2 | 4/2015 | Tofte |
| 9,082,015 | B2 | 7/2015 | Christopulos et al. |
| 2002/0049624 | A1 | 4/2002 | Raveis |
| 2003/0011684 | A1* | 1/2003 | Narayanaswami .......................... H04N 5/232939 348/207.99 |
| 2003/0182246 | A1 | 9/2003 | Johnson et al. |
| 2003/0200123 | A1 | 10/2003 | Burge et al. |
| 2005/0097051 | A1 | 5/2005 | Madill et al. |
| 2005/0228683 | A1 | 10/2005 | Saylor et al. |
| 2005/0251427 | A1* | 11/2005 | Dorai ..................... G06Q 40/08 705/4 |
| 2006/0290974 | A1 | 12/2006 | Kano et al. |
| 2008/0192129 | A1 | 8/2008 | Walker et al. |
| 2009/0021514 | A1 | 1/2009 | Klusza |
| 2009/0138290 | A1 | 5/2009 | Holden |
| 2009/0265193 | A1* | 10/2009 | Collins .............. G06Q 30/0185 901/46 |
| 2010/0030475 | A1 | 2/2010 | Sohl, III et al. |
| 2010/0063852 | A1 | 3/2010 | Toll |
| 2010/0131533 | A1 | 5/2010 | Ortiz |
| 2010/0169231 | A1 | 7/2010 | Bowles et al. |
| 2011/0058048 | A1 | 3/2011 | Elazar et al. |
| 2011/0077028 | A1 | 3/2011 | Wilkes, III et al. |
| 2011/0122995 | A1 | 5/2011 | Ferro, Jr. |
| 2011/0153367 | A1 | 6/2011 | Amigo et al. |
| 2011/0161117 | A1 | 6/2011 | Busque et al. |
| 2011/0282697 | A1 | 11/2011 | Fitzgerald et al. |
| 2011/0320226 | A1 | 12/2011 | Graziano et al. |
| 2012/0029946 | A1 | 2/2012 | Aquila et al. |
| 2012/0076437 | A1 | 3/2012 | King |
| 2012/0109690 | A1 | 5/2012 | Weinrauch et al. |
| 2012/0179431 | A1 | 7/2012 | Labrie et al. |
| 2012/0275651 | A1 | 11/2012 | Brown |
| 2012/0277914 | A1 | 11/2012 | Crow et al. |
| 2012/0317202 | A1 | 12/2012 | Lewis |
| 2013/0037607 | A1 | 2/2013 | Bullwinkel |
| 2013/0083011 | A1 | 4/2013 | Geisner et al. |
| 2013/0085782 | A1 | 4/2013 | Raviv et al. |
| 2013/0087399 | A1 | 4/2013 | Slawinski et al. |
| 2013/0090845 | A1 | 4/2013 | Wakayanagi et al. |
| 2013/0096954 | A1 | 4/2013 | Bodas |
| 2013/0155109 | A1 | 6/2013 | Schultz et al. |
| 2013/0166325 | A1 | 6/2013 | Ganapathy et al. |
| 2013/0230208 | A1 | 9/2013 | Gupta et al. |
| 2013/0279491 | A1 | 10/2013 | Rubin et al. |
| 2013/0297353 | A1 | 11/2013 | Strange et al. |
| 2013/0343635 | A1 | 12/2013 | Omata |
| 2014/0006129 | A1 | 1/2014 | Heath |
| 2014/0009612 | A1 | 1/2014 | King |
| 2014/0067433 | A1 | 3/2014 | Hargrove |
| 2014/0074961 | A1 | 3/2014 | Liu et al. |
| 2014/0111641 | A1 | 4/2014 | Counts, Jr. et al. |
| 2014/0313406 | A1 | 10/2014 | Becker |

FOREIGN PATENT DOCUMENTS

| | | | |
|---|---|---|---|
| EP | 2281255 | A2 | 2/2011 |
| EP | 2388702 | A2 | 11/2011 |
| WO | 1992010807 | A1 | 6/1992 |
| WO | 0135053 | A1 | 5/2001 |
| WO | 2011047125 | A1 | 4/2011 |
| WO | 2012067640 | A1 | 5/2012 |
| WO | 2013072926 | A2 | 5/2013 |
| WO | 2013093932 | A2 | 6/2013 |

OTHER PUBLICATIONS

Nov. 4, 2014—(US) Non-Final Office Action—U.S. Appl. No. 14/061,438.
Nov. 5, 2014—(US) Non-Final Office Action—U.S. Appl. No. 14/061,442.
Jun. 11, 2015—(US) Final Office Action—U.S. Appl. No. 14/061,438.
Jun. 18, 2015—(US) Final Office Action—U.S. Appl. No. 14/061,442.
Jun. 22, 2015—(US) Final Office Action—U.S. Appl. No. 14/061,441.
Apr. 18, 2016—(US) Final Office Action—U.S. Appl. No. 14/061,442.
Apr. 8, 2016—(US) Final Office Action—U.S. Appl. No. 14/061,441.
Feb. 5, 2016—(US) Notice of Allowance—U.S. Appl. No. 14/061,438.
Nov. 30, 2016—(US) Non-Final Office Action—U.S. Appl. No. 14/061,441.
Oct. 5, 2016—(US) Non-Final Office Action—U.S. Appl. No. 14/061,438.
Apr. 6, 2017—(US) Final Office Action—U.S. Appl. No. 14/061,438.
Aug. 21, 2017—(US) Final Office Action—U.S. Appl. No. 14/061,442.
Jul. 19, 2017—(US) Notice of Allowance—U.S. Appl. No. 14/061,438.
Mar. 22, 2017—(US) Non-Final Office Action—U.S. Appl. No. 14/061,442.
May 17, 2017—(US) Final Office Action—U.S. Appl. No. 14/061,441.
Nov. 14, 2017—(US) Non-Final Office Action—U.S. Appl. No. 15/699,409.
Nov. 2, 2017—(US) Non-Final Office Action—U.S. Appl. No. 15/080,777.
Apr. 20, 2018—(US) Notice of Allowance—U.S. Appl. No. 15/080,777.
May 2, 2018—(US) Notice of Allowance—U.S. Appl. No. 15/699,409.
Oct. 5, 2018—(US) Non-Final Office Action—U.S. Appl. No. 16/041,242.
Aug. 5, 2019—(US) Notice of Allowance—U.S. Appl. No. 16/041,242.

* cited by examiner

COMMUNICATION SCHEMES FOR PROPERTY CLAIMS ADJUSTMENTS

CROSS-REFERENCE TO RELATED APPLICATIONS

This application is a continuation of and claims priority to co-pending U.S. application Ser. No. 16/295,243, filed Mar. 7, 2019, and entitled "Communication Schemes for Property Claims Adjustments," which is a continuation of and claims priority to U.S. application Ser. No. 14/061,424, filed Oct. 23, 2013, and entitled, "Communication Schemes for Property Claims Adjustment," all of which are incorporated hereby by reference in their entirety.

TECHNICAL FIELD

The present disclosure relates to systems and methods for analyzing property damage for insurance purposes.

BACKGROUND

Conventional insurance claims processing is a complex process that starts with a first notification of loss related to an insured item. Upon notification of loss, the claim may be routed to multiple claims adjusters that analyze different aspects of the damage associated with the insured item in order to determine whether compensation for the loss is appropriate.

In general, conventional claims adjustment can involve paperwork processing, telephone calls, and potentially face-to-face meetings between claimant and adjuster. In addition, a significant amount of time can elapse between a first notice of loss from the claimant and the final settlement of the claim.

In addition, while consumers may take advantage of conventional claims processing to determine if they will receive any compensation for loss associated with an item, consumers have traditionally had very few options for obtaining advice associated with loss prior to submission of an insurance claim.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Certain aspects disclose a method comprising: receiving, at a server, images of damaged property from a mobile device; determining, at the server, if the images are acceptable for analysis; sending, at the server, instructions for capturing additional images if the images of damaged property are not acceptable for analysis; analyzing, at the server, the images of damaged property if the images are acceptable for analysis; and providing, at the server, feedback to the mobile device.

Certain other aspects disclose a non-transitory computer-readable storage medium having computer-executable program instructions stored thereon that when executed by a processor, cause the processor at least to: receive, at a server, images of damaged property from a mobile device; determine, at the server, if the images are acceptable for analysis; send, at the server, instructions for capturing additional images if the images of damaged property are not acceptable for analysis; analyze, at the server, the images of damaged property if the images are acceptable for analysis; and provide, at the server, feedback to the mobile device.

Certain other aspects disclose an apparatus comprising: a processor; and a memory storing computer-readable instructions that, when executed by the processor, cause the apparatus at least to: receive images of damaged property from a mobile device; determine if the images are acceptable for analysis; send instructions for capturing additional images if the images of damaged property are not acceptable for analysis; analyze the images of damaged property if the images are acceptable for analysis; and provide feedback to the mobile device.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, sever to explain principles of the disclosure. In the drawings:

DETAILED DESCRIPTION

In accordance with various aspects of the disclosure, methods, non-transitory computer-readable media, and apparatuses are disclosed for adjusting property claims. In certain aspects, when a server receives data from a computing device, the server processes and analyzes the data.

Figure 1:
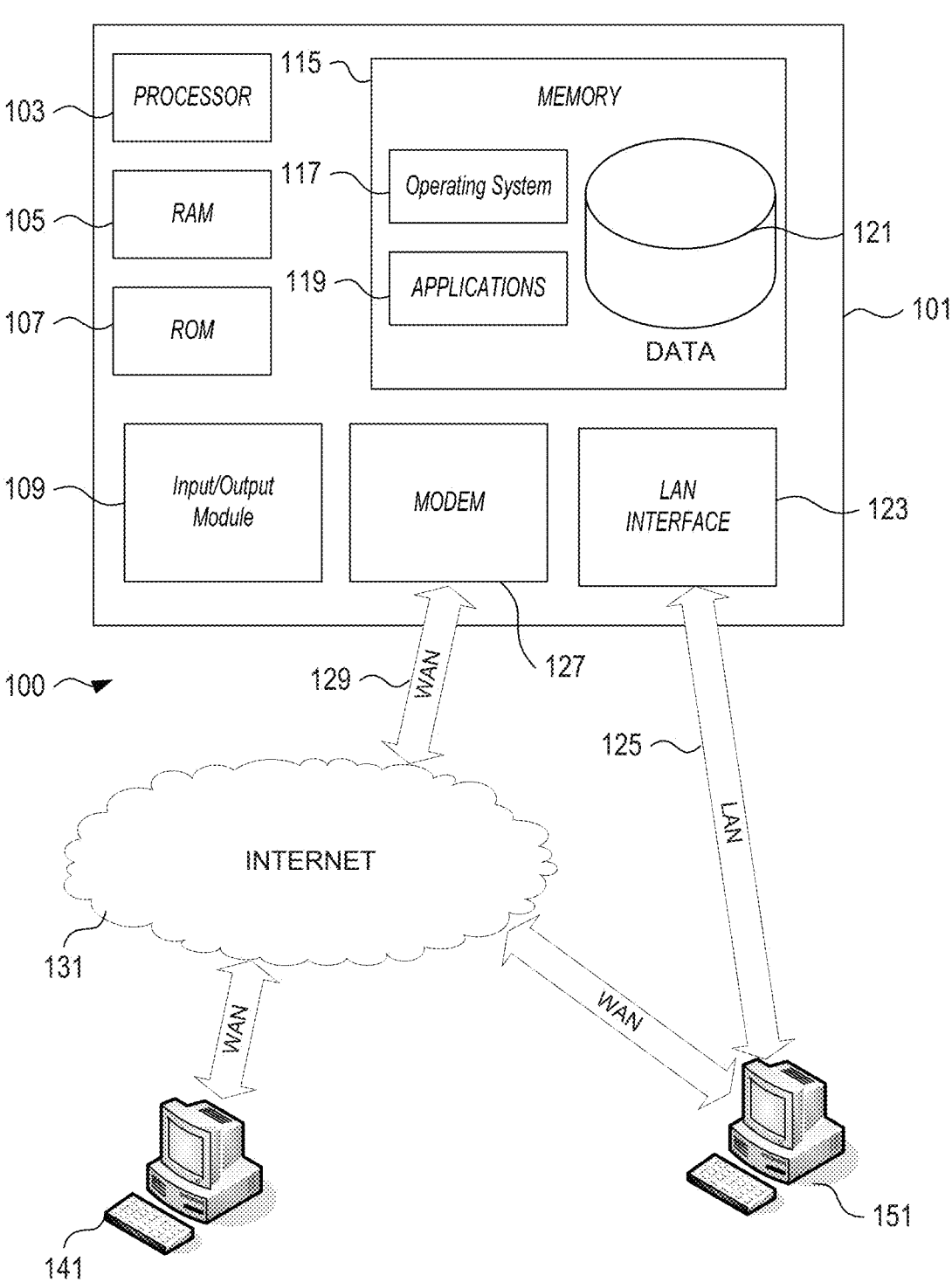
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

With reference to FIG. 1, the computing system environment 100 may include a server 101 wherein the processes discussed herein may be implemented. The server 101 may have a processor 103 for controlling the overall operation of the server 101 and its associated components, including random-access memory (RAM) 105, read-only memory (ROM) 107, communications module 109, and memory 115. Processor 103 and its associated components may allow the server 101 to run a series of computer-readable instructions related to receiving, storing, and analyzing data to determine an event's risk level.

Server 101 typically includes a variety of computer-readable media. Computer-readable media may be any available media that may be accessed by server 101 and include both volatile and non-volatile media, removable and non-removable media. For example, computer-readable media may comprise a combination of computer storage media and communication media.

Computer storage media include volatile and non-volatile, removable and non-removable media implemented in any method or technology for storage of information such as computer-readable instructions, data structures, program modules, or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information that can be accessed by server 101.

Computing system environment 100 may also include optical scanners (not shown). Exemplary usages include scanning and converting paper documents, such as correspondence, data, and the like to digital files.

Although not shown, RAM 105 may include one or more applications representing the application data stored in RAM 105 while the server 101 is on and corresponding software applications (e.g., software tasks) are running on the server 101.

Communications module 109 may include a microphone, keypad, touch screen, and/or stylus through which a user of server 101 may provide input, and may also include one or more of a speaker for providing audio output and a video display device for providing textual, audiovisual and/or graphical output.

Software may be stored within memory 115 and/or storage to provide instructions to processor 103 for enabling server 101 to perform various functions. For example, memory 115 may store software used by the server 101, such as an operating system 117, application programs 119, and an associated database 121. Also, some or all of the computer executable instructions for server 101 may be embodied in hardware or firmware.

Server 101 may operate in a networked environment supporting connections to one or more remote computing devices, such as computing devices 141 and 151. The computing devices 141 and 151 may be personal computing devices or servers that include many or all of the elements described above relative to the server 101.

The network connections depicted in FIG. 1 include a local area network (LAN) 125 and a wide area network (WAN) 129, but may also include other networks. When used in a LAN networking environment, server 101 may be connected to the LAN 125 through a network interface or adapter in the communications module 109. When used in a WAN networking environment, the server 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system may be operated in a client-server configuration to permit a user to retrieve web pages from a web-based server. Any of various conventional web browsers may be used to display and manipulate on web pages.

Additionally, one or more application programs 119 used by the server 101, according to an illustrative embodiment, may include computer executable instructions for invoking functionality related to communication including, for example, email short message service (SMS), and voice input and speech recognition applications. In addition, the application programs 119 may include computer executable instructions for invoking user functionality related to access a centralized repository for performing various service tasks like routing, logging, and protocol bridging.

Embodiments of the disclosure may include forms of computer-readable media. Computer-readable media include any available media that can be accessed by a server 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For instance, aspects of the method steps disclosed herein may be executed on a processor 103 on server 101. Such a processor may execute computer-executable instructions stored on a computer-readable medium.

Figure 2:
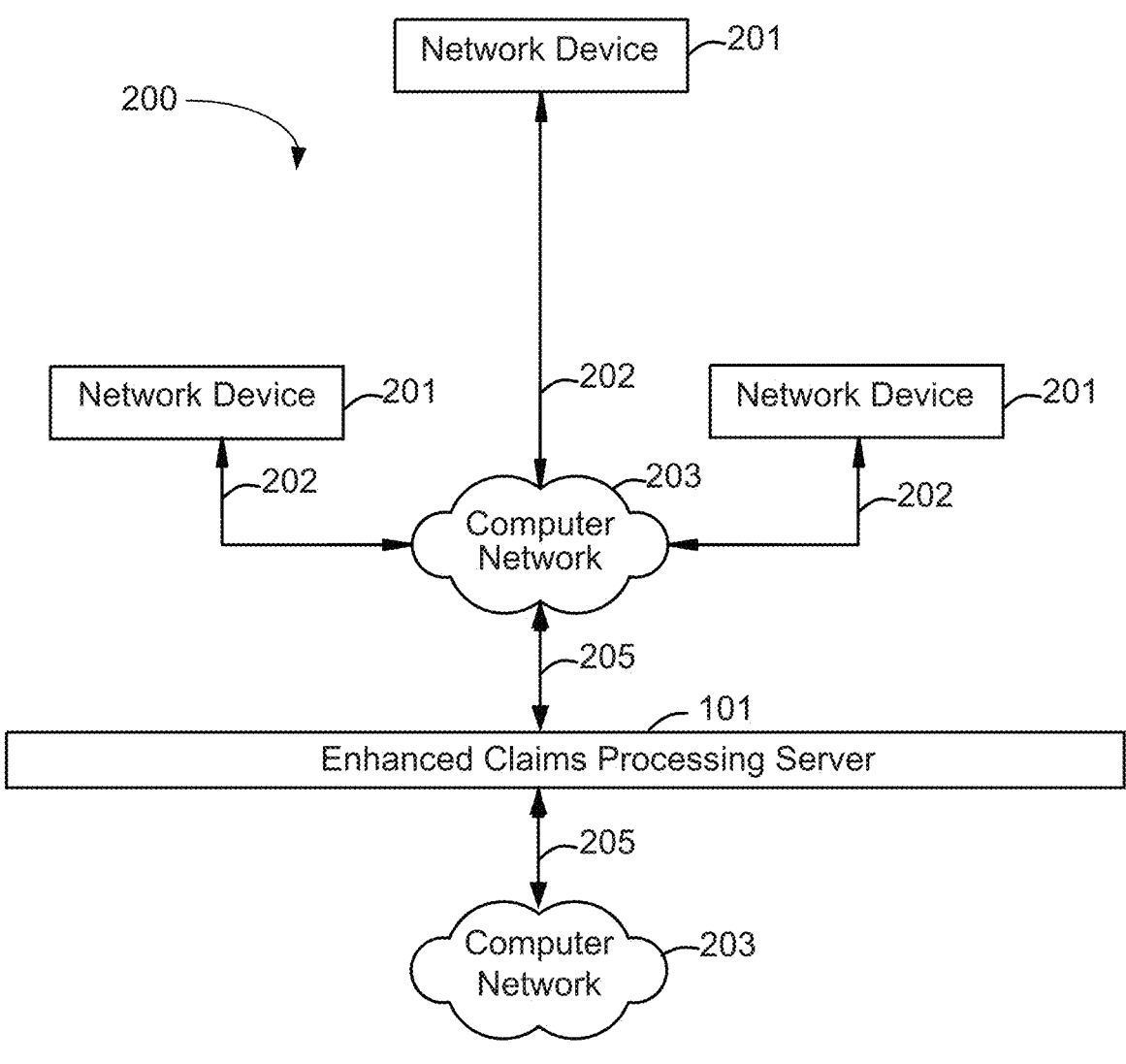
FIG. 2 shows an illustrative block diagram of workstations and servers that may be used to implement the processes and function of one or more aspects of the present disclosure.

FIG. 2 illustrates another example operating environment in which various aspects of the disclosure may be implemented. As illustrated, system 200 may include one or more network devices 201. Devices 201 may be local or remote, and are connected by one or more communications links 202 to computer network 203 that is linked via communications links 205 to enhanced claims processing server 101. In certain embodiments, network devices 201 may run different algorithms used by server 101 for analyzing image data showing damage associated with an insured item, or, in other embodiments, network devices 201 may be data stores for storing reference image data of insured items. In yet other embodiments, network devices 201 may represent mobile user devices configured to capture image data (e.g., via a camera, etc.) associated with a damaged insured item and to transmit the image data to server 101. In system 200, enhanced claims processing server 101 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between network devices 201 and server 101, such as network links, dial-up links, wireless links, hard-wired links, etc.

In accordance with aspects of the disclosure, a user (e.g., a claimant) of a mobile device (e.g., mobile phone, personal digital assistant (PDA), etc.) may take a variety of photos (or, e.g., audio or video) associated with damage to insured property. The photos may include individual property items, such as a sofa, a dresser, a television, etc. The photos may also include dwellings, such as houses, apartments units, offices, etc. In some aspects, the photos may also include portions of a dwelling, such as a door, window, wall, etc. Furthermore, the photos may include documents.

After the user is satisfied that the appropriate photos have been taken, the user may transmit the photos to an enhanced claims processing server 101. The enhanced claims processing server 101 (or, e.g., the mobile device) may be configured to receive and analyze the photos to determine if they meet a predefined set of criteria (e.g., not too blurry, correct angles, etc.) for completeness, accuracy, etc. If the photos do not meet the minimum criteria, server 101 may transmit a message (e.g., via a feedback loop), informing the mobile device that alternative and/or additional photos must be taken. This process of assuring that the photos are compliant for further analysis may be repeated until the user of device 201 has complied with all of the rules set forth by enhanced claims processing server 101. Server 101 may then analyze the photos to generate an output, including a cost estimate to repair the damage associated with the insured property and/or to replace a damaged part of the insured property. In some aspects, to generate this output, server 101 may analyze the photos and determine the location of damage, extent of damage, and/or the cost to fix the damage.

Although embodiments of the disclosure discussed herein relate to an insured property analyzed by enhanced claims processing server 101, one of ordinary skill in the art would recognize that other types of insured items, including automobiles, may be employed with a similar scheme.

In certain aspects, server 101 may aid in cutting down time between a first notice of loss and settlement of the claim (e.g., real-time settlement of a claim) associated with the loss (e.g., via a payment and/or information regarding repair/replacement of an insured item). In addition, because the methods discussed herein are automated and allow claims adjusters to inspect damages remotely or reduce the involvement of claims adjusters, less time and money may be spent to transport these adjusters to inspection locations. The automated nature of this process may also create the opportunity for remote human inspections of damage associated with insured items.

Having described an example of a computing device that can be used in implementing various aspects of the disclosure and an operating environment in which various aspects of the disclosure can be implemented, several embodiments will now be discussed in greater detail.

Figure 3:
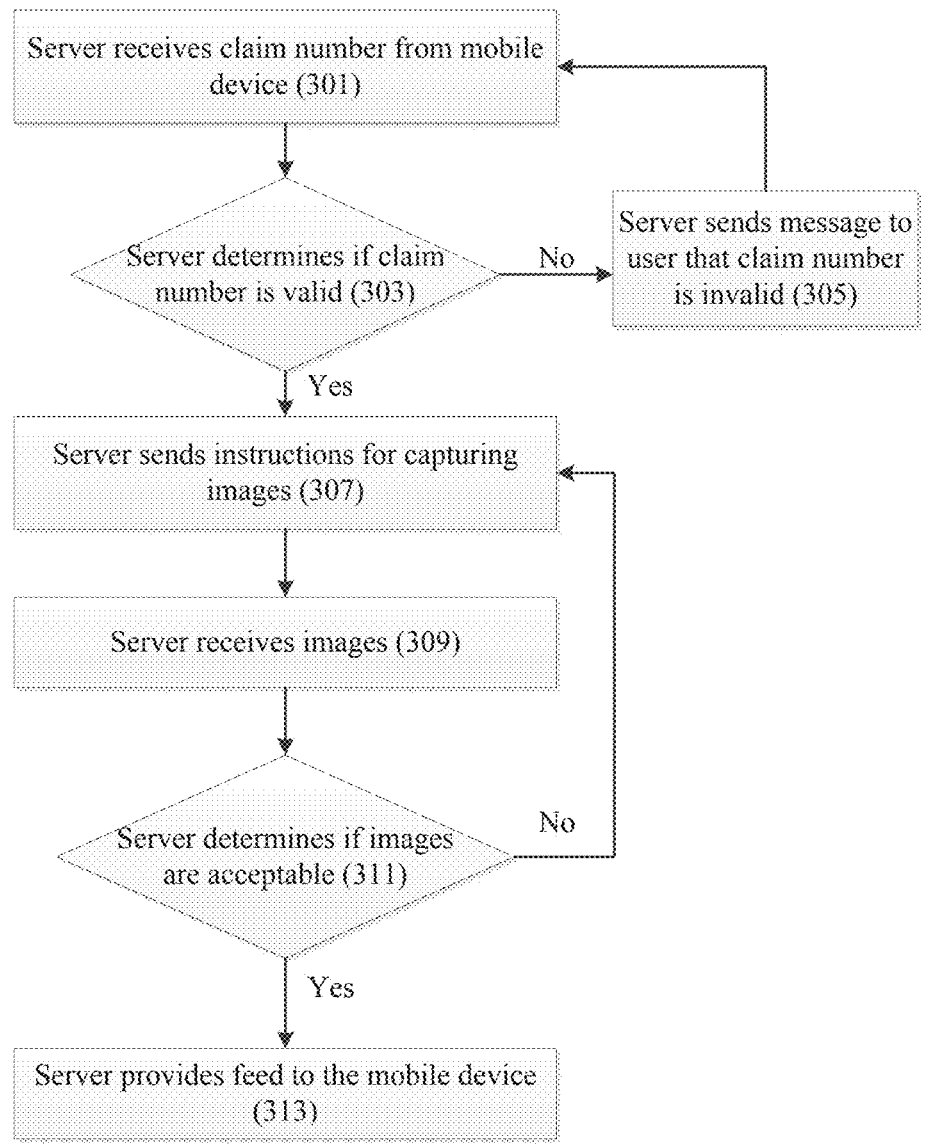
FIG. 3 shows a flow chart of a process for interacting with a server in accordance with aspects of the present disclosure.

FIG. 3 shows an automated damage assessment process 300 in accordance with at least one aspect of the present disclosure. In certain aspects, an application related to damage assessment and claims processing may be downloaded onto a mobile device (e.g., iPad™, iPhone™, Android™, etc.) associated with a user (e.g., a customer of an insurance company) to facilitate one or more steps of the process in FIG. 3.

The process illustrated in FIG. 3 may begin at step 301 where a user (e.g., a customer) associated with an entity managing enhanced claims processing server 101 (e.g., insurance company) may enter a claim number (e.g., a number related to damage associated with an insured vehicle, etc.) into a damage assessment and claims processing application running on a mobile device (e.g., network device 201). To generate a claim number, a claimant may contact an entity managing enhanced claims processing server 101 (e.g., an insurance company, etc.) with a first notice of loss (FNOL). The claimant may contact the insurance company in any number of ways, including via agent, by phone, by email, via a company website, etc. As part of the FNOL, the claimant may provide basic identifying and/or validating information (e.g., name, age, claim number, etc.) and information about the insured property (e.g., a description of the property). The claimant may also provide the general description of the damage to the property and describe, if known, how the damage occurred. In some embodiments, this information may be provided from a remote location (e.g., claimant's home, agent's office, etc.) using an application loaded onto a smart phone or tablet (e.g., iPad™, iPhone™, Android™, etc.).

The mobile device may then transmit the entered claim number and related information to enhanced claims processing server 101. The process may then move to step 303 where server 101 may determine, at a claim validation module (stored in memory 115), if the claim number received in step 301 is valid. If the claim validation module determines that the claim number is not valid, then server 101 may transmit a message to the mobile device, stating that the claim number is invalid in step 305. The user may then be prompted to enter another claim number (step 301).

If the claim validation module determines that the claim number is valid, the process may move to step 307 where server 101 may send the user instructions of the types of image data (e.g., photos, video, audio, etc.) that should be captured of damage associated with the insured property. It should also be noted that in some embodiments server 101 may not receive a claim number and may proceed in providing user instructions on the types of image data that should be captured without receiving a claim number. The user may receive instructions on various types of photos/video, including photos/video of the insured property or items. In some aspects, the user may capture image data related to at least two different angles of the damage for each panel (e.g., hood, fender, door, bumper, etc.) based on an initial claim description. The user may also capture image data related to property (e.g., house, apartment, etc.).

When the user of the mobile device receives these instructions, the user may use a camera associated with the mobile device to take the photos and transmit these photos to the server 101. The user may be allowed to preview each photo before selecting the image. Once a photo has been selected, the image may be shown on a display associated with the mobile device under a photo type (e.g., a photo of the entire damaged property, a portion of the property, the particular angle of the property, etc.). If the user is not satisfied with any photo, the user may delete the photo by selecting it and then retake the photo. In some aspects, the user may annotate the photos (e.g., by circling the area of damage, etc.) prior to transmitting them to server 101. In yet other embodiments, server 101 or the insurance company may itself annotate any received photos/video using an annotation module stored in memory 115.

In some embodiments, any approved photo may not be sent to server 101 until all of the images have been captured. In some aspects, server 101 may support a website interface through which photos may be uploaded by a user of a mobile device. Also, the use of multiple photos (e.g., via stereoscopic techniques), video (e.g., by walking around the house to generate a complete view), and/or three-dimensional photos/video may assist in determining the depth of damage to an insured item or property. In addition, the degree of damage by area and depth may be automatically estimated through tools similar to ultrasound tools. Knowing the depth of damage may also assist in automatically determining the cost of repair or replacement. In addition, as the user is taking video/photos of damage associated with the insured item or property, a claims adjuster associated with server 101 (e.g., an insurance company) may interface with the user in real-time (e.g., via messaging, phone, email, etc.) as the photos are being sent to the adjuster and/or as the video is being streamed to the adjuster and describe to the user the photos/video that still need to be taken and/or where to place a camera as the photos/video are captured.

In some aspects, an insurance employee (e.g., a claims adjuster, mitigation vendor, agent, etc.) may control the image being captured by the mobile device via an image control module stored in server 101. The user may hold the mobile device with photographic and/or video capturing capabilities activated. The user may be located at a remote location from the insurance employee. However, using the image control module, the insurance employee may be able to view the displays from the mobile device (e.g., the mobile device may include a camera which the user is holding to display a damaged house, etc.) and control the image capturing functionality in real time (e.g., the insurance employee may zoom in or zoom out, adjust lighting and flash, etc.). The insurance employee may control the mobile device by accessing a website hosted by server 101, launching software, etc. In some aspects, the insurance employee may adjust the direction the camera included in the mobile device is facing. In other aspects, the insurance employee may communicate with the user (e.g., via telephone, email, instant messaging, etc.) and instruct the user where to focus the camera lens (e.g., insurance employee may tell the user to move the camera five feet to the left so the insurance employee can get a better view of the damaged property, etc.). Thus, as described further herein, descriptions of use of the mobile device by a user may be equally applicable to insurance employees operating the mobile device remotely.

In certain aspects, the mobile device may account for network considerations and include a shoot now, transfer later module. Using this module, a user may capture an image (e.g., photo, video, audio, etc.) with the mobile device. The image may preferably be captured in high definition resolution, but may alternatively be captured with lower resolution. Although the image (e.g., damaged insured property or items) may be captured in high definition, network conditions (e.g., low bandwidth, mobile device troubleshooting, etc.) may not allow transfer of the image to server 101 in high definition. Therefore, in some aspects, the mobile device may capture the image and store the image locally at the mobile device. The mobile device may store multiple images until network conditions improve, and then automatically transfer the images to server 101 in high definition. In some aspects, the mobile device may store the images locally until the user prompts the mobile device to transfer the images to server 101 in high definition. The shoot now, transfer later module may, therefore, lower mobile device data costs for the user because s/he will not be required to pay extra costs to transfer the image when there are bandwidth constraints. Instead, the user may transfer the images once the mobile device is connected to other networks (e.g., Wi-Fi network, etc.).

In some embodiments, the mobile device may include a time-shifting module. The time-shifting module allows a user to capture and store images with the mobile device in high definition. When network conditions are poor, the mobile device may transfer the images to server 101 in low definition in real time. Later, when network conditions permit, the mobile device may transfer the same images in high definition. The mobile device may transfer the images automatically or when prompted by the user.

In some aspects, the mobile device may capture images in low definition as a default. When there are noteworthy items or property, the mobile device may capture those images in high definition. For instance, a user may wish to capture images of fire damage to his house. So, the user may capture video of the house using the mobile device. As he walks around the house to capture all the damage to the property, the mobile device may transfer the video to server 101 in low definition for areas of the house that are not damaged. When the mobile device captures areas of the house that have been damaged (e.g., noteworthy items or property), the mobile device may send the images of damaged property in high definition. In certain aspects, the user may determine the noteworthy property and transfer those images in high definition (e.g., user may select a button on the mobile device to transfer in high definition, etc.). In some aspects, and as will be discussed in greater detail below, the mobile device may determine which images are noteworthy by comparing items in the images to items stored in images in memory 115. After the noteworthy image has been captured in high definition, the mobile device may automatically switch back to capturing images in low definition.

In some aspects, the mobile device may include one or more sensors (e.g., accelerometer, compass, thermometer, etc.). As described in greater detail below, the sensors may be used by server 101 and the entity associated with server 101 (e.g., an insurance company), to detect fraud. In certain aspects, the mobile device may also include a geocalculation module. The geocalculation module may allow the user to set reminders to capture and transfer images of insured property. For example, a user may access the property imaging application from her smart phone. The user may select an option from the application to be reminded to capture images of her property when she returns home. The geocalculation module stored in the mobile device may be able to detect when the user returns home (e.g., using a compass, accelerometer, etc.), and prompt (e.g., audio prompt, graphical, etc.) the user to send a property image. It should be appreciated that the geocalculation module may be enabled to prompt the user for various locations outside the home (e.g., office, and other locations).

Figure 4:
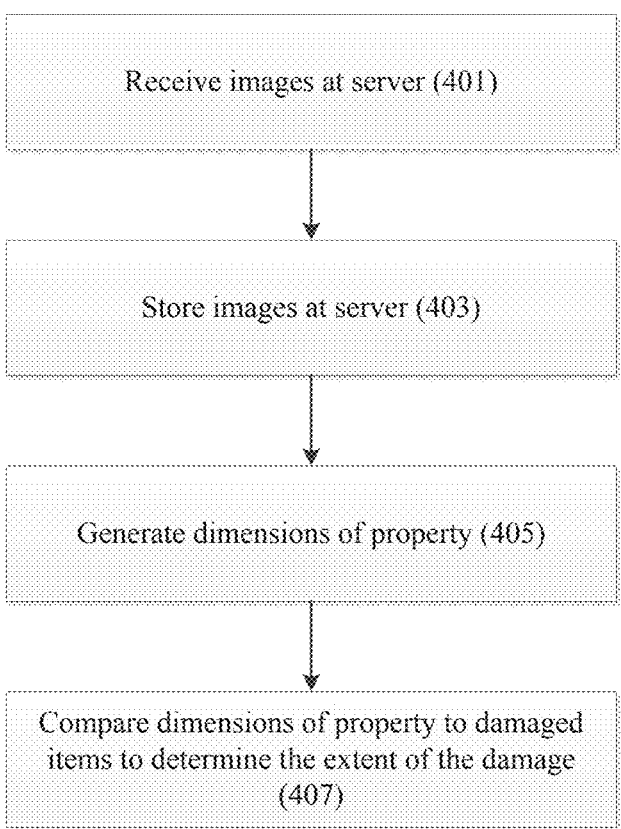
FIG. 4 shows a flow chart of a property damage estimator process in accordance with certain aspects of the present disclosure.

In certain aspects, server 101 may include a scene capture module in memory 115. The scene capture module may enable server 101 to create a more holistic view of the property captured by the mobile devices. An exemplary process with which a screen capture module may operate is illustrated in FIG. 4. The screen capture module may receive images from one or more mobile devices at step 401. In some aspects, user may use a mobile device to capture images of property after damage has occurred. In some aspects, the user may capture images of property before damage has occurred. By capturing and transferring images of property prior to damage, and again after damage has occurred, the user is able to maintain "before and after" images of his insured property. The images may be stored in the mobile device, or server 101, or both.

After server 101 receives the images at step 401, it may store the images at step 403. The images may be stored in memory 115, for example in database 121.

At step 405, the server 101 may generate dimensions of a property (e.g., house, room, apartment unit, etc.). In some aspects, the user may provide the dimensions of the property to server 101 (e.g., via the mobile application, website, etc.). For example, a user may capture video of his house and input the dimensions of each wall into the mobile device as he walks around the house. Server 101 may store these generated dimensions at memory 115. In certain aspects, server 101 may access public records (e.g., via the Internet) to generate the dimensions of an insured property. Server 101 may associate the dimensions of the insured property with other data stored for that particular user in memory 115 (e.g., using a unique identifier).

The mobile application running on a mobile device may be able to determine the dimensions of the property being captured by the mobile device. The mobile application, or e.g., server 101 or mobile device, may include a measurement component (e.g., a ruler, etc.), that may be able to automatically determine the dimensions of a property. By capturing video or photos, the mobile device may be able to determine the dimensions of the property automatically. In some aspects, the mobile device may use sensors to aid in determining the dimensions of the property. In some aspects, the mobile device or server 101 may automatically identify items in a room, and automatically generate the dimensions of the room by providing an overlay of rulers over items in the room. In certain aspects, the mobile device and/or server 101 may capture three-dimensional views of the room and items within the room (e.g., using the sensors and overlay of rulers).

In certain aspects, an autostitch module in server 101 may aid the scene capture module in generating the dimensions of a property. The autostitch module may autostitch photos taken by a mobile device using metadata (e.g., compass, geotag, accelerometer tracking movement of the mobile device, etc.). In other words, the autostitch module may enable server 101 to combine photos it receives from a mobile device in order to create an automatic scene of a room, including the content of the room. A user may walk around a room or series of rooms, taking photographs of each room from multiple viewpoints. The mobile device capturing the photographs may then transfer the photographs to server 101, where the photographs may be stored in memory 115. As server 101 receives the photographs, or in some aspects, after server 101 receives all of the photographs, the autostitch module may combine (or stitch) the photos together to generate a panoramic view of each room. The panoramic view may allow an insurance employee (e.g., adjuster) to view a scene more clearly, with a 360 degree view of the rooms. Server 101 may use the autostitch module to generate a three-dimensional view of the rooms and contents of the rooms.

The autostitch module may also allow an insurance employee to determine gaps (e.g., portions of the property that are not captured between two stitched images) in the scene of a property. In some aspects, server 101 may recognize the gaps in the images automatically. In other aspects, an insurance employee may identify gaps by accessing server 101. For instance, a user may take photographs of his insured house using a mobile device after damage to a room. The user may access the property imaging mobile application on the mobile device to send his photographs to an insurance adjuster in real time. The user may also be speaking to the insurance adjuster over the phone as he uses the mobile device. As the user walks around the damaged room, server 101 may autostitch received photos for panoramic display by the insurance adjuster. Server 101 or the insurance adjuster may notice gaps between received photos (e.g., blank spaces, visual indicators, etc. between photos), and the adjuster may instruct the user to take another photograph at the location of the gap to complete the panoramic view. In some aspects, server 101 may use metadata (e.g., data from accelerometer, compass, etc. recorded by mobile device) to determine a gap's location.

The mobile device may use third-party applications (e.g., MagicPlan by Sensopia) to aid in stitching photos together. The third-party applications may perform edge detection in images (e.g., of walls) and identify corners, thereby aiding server 101 in creating a more holistic view of the scene.

In some aspects, after dimensions of the property have been generated at step 405, server 101 may compare the dimensions of the property to the damaged items to determine the extent of damage to the items at step 407. For example, if a user wants to report damage to a portion of a wall in a room of her house, she may capture images with her mobile device for transfer to server 101 as described above. After server 101, generates the dimensions for the room with the damaged wall (e.g., the wall may be 10 feet long), server 101 may compare the damaged area of the wall to the dimensions of the entire wall to determine the size of the damaged area (e.g., damaged area may be determined to be 2 feet long). Server 101 may use a damage extent module (e.g., stored in memory 115) to perform similar calculations for various dimensions of the damage (e.g., length, width, depth, etc.). Server 101 may perform similar calculations for damaged items (e.g., dresser, television, table, etc.) in a room as well. For instance, server 101 may determine that a wall in the room containing a damaged dresser is 10 feet long. The damage extent module may analyze the images of the room and dresser to scale and determine that the dresser contains a 6 inch cut along its side. Thus, server 101 may be able to determine the extent of damage to property and items (e.g., insured property and items) based on comparison with generated dimension of the property at step 405.

In certain aspects, mobile device may utilize overlay rulers to automatically measure items in a room. Similar to the method of generating dimensions of property to determine the extent of damage discussed above, the damage extent module may determine the dimensions of items in a room (e.g., using sensors in the mobile device to record results which may be analyzed at server 101). The dimensions of the items may be compared to the damage in the room to determine the extent of the damage in the room (e.g., server 101 may compare a table determined to be 3 feet high to the damage reported at a door to determine that the damage to the door is 1 foot in length). In some aspects, as will be discussed in greater detail below, server 101 may automatically identify items in a room, and may compare these items to the damage to gain a frame of reference for the damage. For example, server 101 (or the mobile device) may receive images and automatically identify a lamp. By comparing the lamp to the damage, server 101 gains a frame of reference for the extent of the damage. In such aspects, server 101 may not necessarily obtain precise dimensions of the damage, but may instead obtain an estimated size of the damage (e.g., damage is less than the size of a table lamp). In certain aspects, server 101 may identify hot areas for automatic identification of items (e.g., areas with significant anomalies in received images).

When determining the extent of damage to property (e.g., insured property), server 101 may compare images of the property after the damage has occurred with images of the property prior to the damage. Server 101 or a third-party (e.g., an insurance employee) may compare the before and after images to obtain a more complete understanding of the damage. The images prior to the damage may illustrate the condition of the property (e.g., television, desk, etc.) prior to a FNOL and enable server 101 (or insurance employee) to determine whether the property was in pristine condition, showing signs of wear and tear, already damaged, etc. Comparison of the image with images received after a FNOL may provide an insurance company with greater insight in determining a proper claims adjustment.

Figure 5:
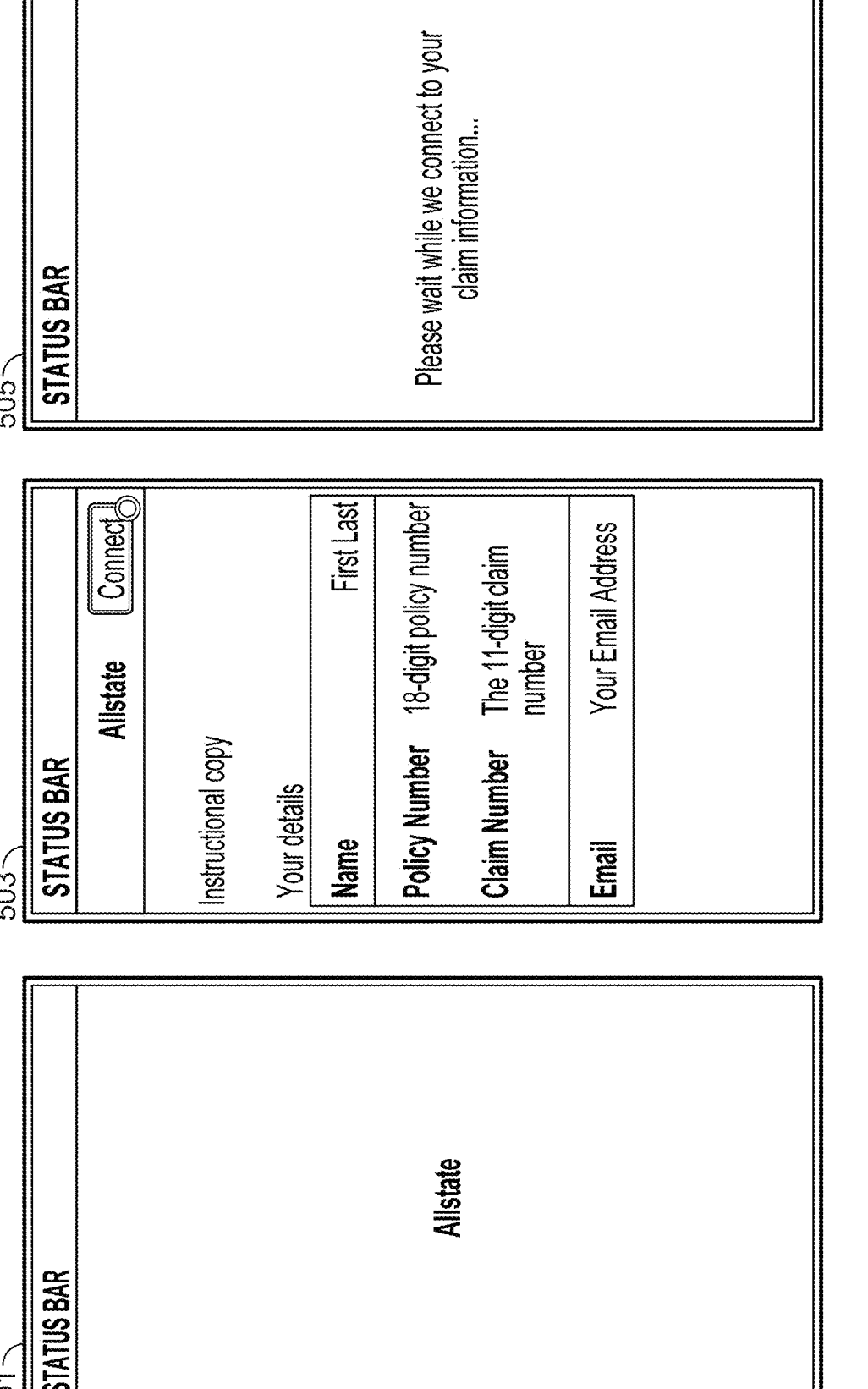
FIGS. 5-12 show illustrative screen shots of a mobile application in accordance with various aspects of the present disclosure.

FIGS. 5-12 shows various display screens displayed to a user of a mobile device in accordance with aspects of the present disclosure. FIG. 5 illustrates a series of initial display screens displayed when a user starts a property damage estimator (e.g., property imaging) application stored on a mobile device (e.g., network device 201) in accordance with at least one aspect of the present disclosure. Screen 501 may be the initial screen the user views upon launching the property damage estimator application (hereinafter, "the Application"). Screen 501 may automatically transition to screen 503. Screen 503 may allow a user to input information into the Application. The user may be prompted to input information such as the user's name, policy, claim number, email, etc. In certain aspects, the claim number may be used to compare a damage estimate generated by analysis of images submitted by the user to a damage estimate generated manually by a claims adjuster using more conventional claims adjustment techniques. The user may enter the information using keypad provided by the mobile device. After the user has entered the requisite information, the user may select the "Connect" button (highlighted on the upper right corner of screen 503). If so, screen 503 may automatically transition to screen 505. Screen 505 may display a message (e.g., "Please wait while we connect to your claim information . . . ") to notify the user that the Application is transitioning between screens. Screen 505 may be displayed between any two screens to notify the user that the Application is connecting to server 101, or to provide any similar type of notification between screens.

Figure 6:
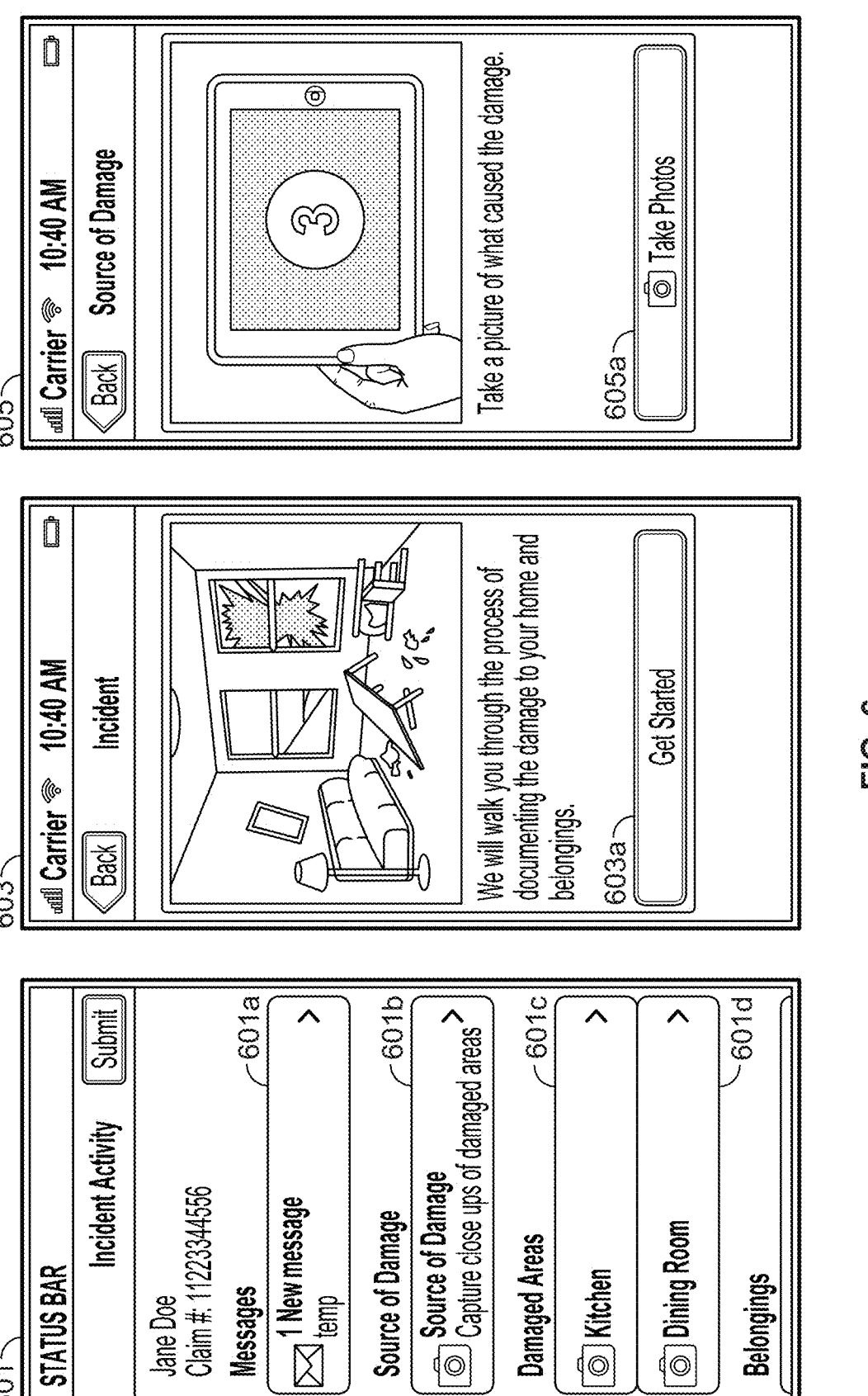

In some aspects, the Application may, then, transition to images displayed in FIG. 6. Screen 601 an Incident Activity screen. An Incident Activity screen may serve as a type of home screen for each particular user. As shown in screen 601, the Incident Activity screen may include the user's name and claim number. Screen 601 may also display an inbox of user messages. By selecting the messages button 601*a*, the user may access messages it has received and sent (e.g., correspondence with an insurance company).

In certain aspects, the fields populated on screen 601 (e.g., damages areas: kitchen 601*c* and dining room 601*d*) may be populated from server 101 after the user submits a claim. For example, the user may have submitted a claim for water damage which affected the user's kitchen and dining room. Therefore, server 101 may provide screen 601 with the damaged areas fields identified as the kitchen and dining room. Conversely, if the user submitted a claim only identifying the living room as the damaged area, screen 601 may display damaged areas as only the living room. In some aspects, screen 601 may list various rooms for the user to choose from, without requiring the user to first submit a claim to an insurance agency.

Screens 603 and 605 are examples of instructions 307 that may be provided to the user. Screens 603 and 605 may be displayed prior to screen 601, or displayed prior to screen 601 only for first time users of the Application, or immediately after screen 601, or upon request by the user. Screen 603 may provide a user with instructions for documenting damages to property and items. When a user selects the Get Started button 603*a*, a tutorial may be displayed to walk the user through the process of documenting the damage to property and items. The tutorial may be an exemplary video, series of instructions via text, images, video, and/or audio, etc.

After displaying screen 603, or after a user selects Source of Damage button 601*a* from screen 601, the mobile device may display screen 605. Screen 605 may provide the user with instructions (e.g., text, images, video, audio, etc.) for capturing images of the source of the damaged property (e.g., busted water pipe, source of fire, etc.). The user may, then, proceed to take photos of the source of damage by selecting button 605*a*.

Figure 7:
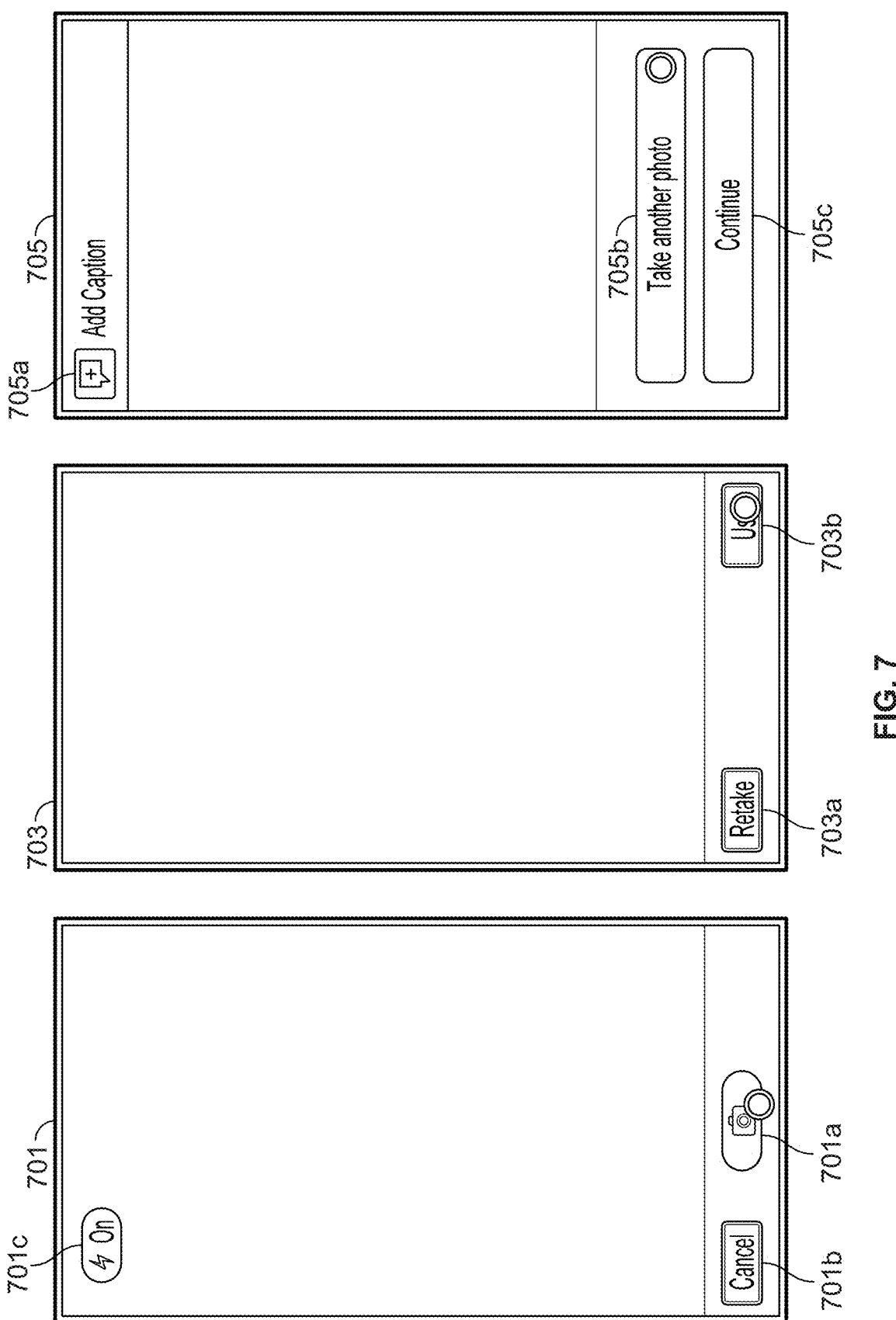

Camera screen 701, in FIG. 7, illustrates a screen that may be displayed after a user selects button 605*a* in screen 605 or 601*b* in screen 601. Camera screen 701 may enable a user to capture images of the source of damage. The blank area in camera screen 701 may be where a user may view the images he wishes to capture. By maneuvering the mobile device, which may include a camera lens, the user may view where the lens is focused via camera screen 701. When the user is ready to capture an image (e.g., photograph, video, etc.), he may select shutter button 701*a* to capture the image as highlighted. The user may turn the camera flash on or off by selecting button 701*c* or escape to Incident Activity screen 601 by selecting the Cancel button 701*b*.

After the user selects the shutter button 701*a*, screen 701 may transition to screen 703 for display to the user. Screen 703 allows the user to review the image captured in screen 701. The user may select the Retake button 703*a* to discard the captured image and return to screen 701. If the user is satisfied with the image, he may select the Use button 703*b* as highlighted.

After the user selects the use button 703*b*, the mobile device may display screen 705. Screen 705 may display the captured image with three button options for the user (705*a*, 705*b*, and 705*c*). If the user selects Add Caption button 705*a*, a dropdown menu may be provided where the user may input additional text via the mobile device's keypad (or, e.g., via voice). The user may provide captioning to add context to the captured image. The user may decide whether he would like to capture another image of the source of damage. If so, the user may select Take another photo button 705*b* as highlighted. If the user selects button 705*b*, the captured image may be sent to server 101, and the mobile device may display camera screen 701 to enable the user to take another photo of the source of damage and repeat the process from screen 701 to 705. If the user does not want to take another photo, he may select the Continue button 705*c*. Selecting button 705*c* may transfer the image to the server and display screen 801 on the mobile device.

Figure 8:
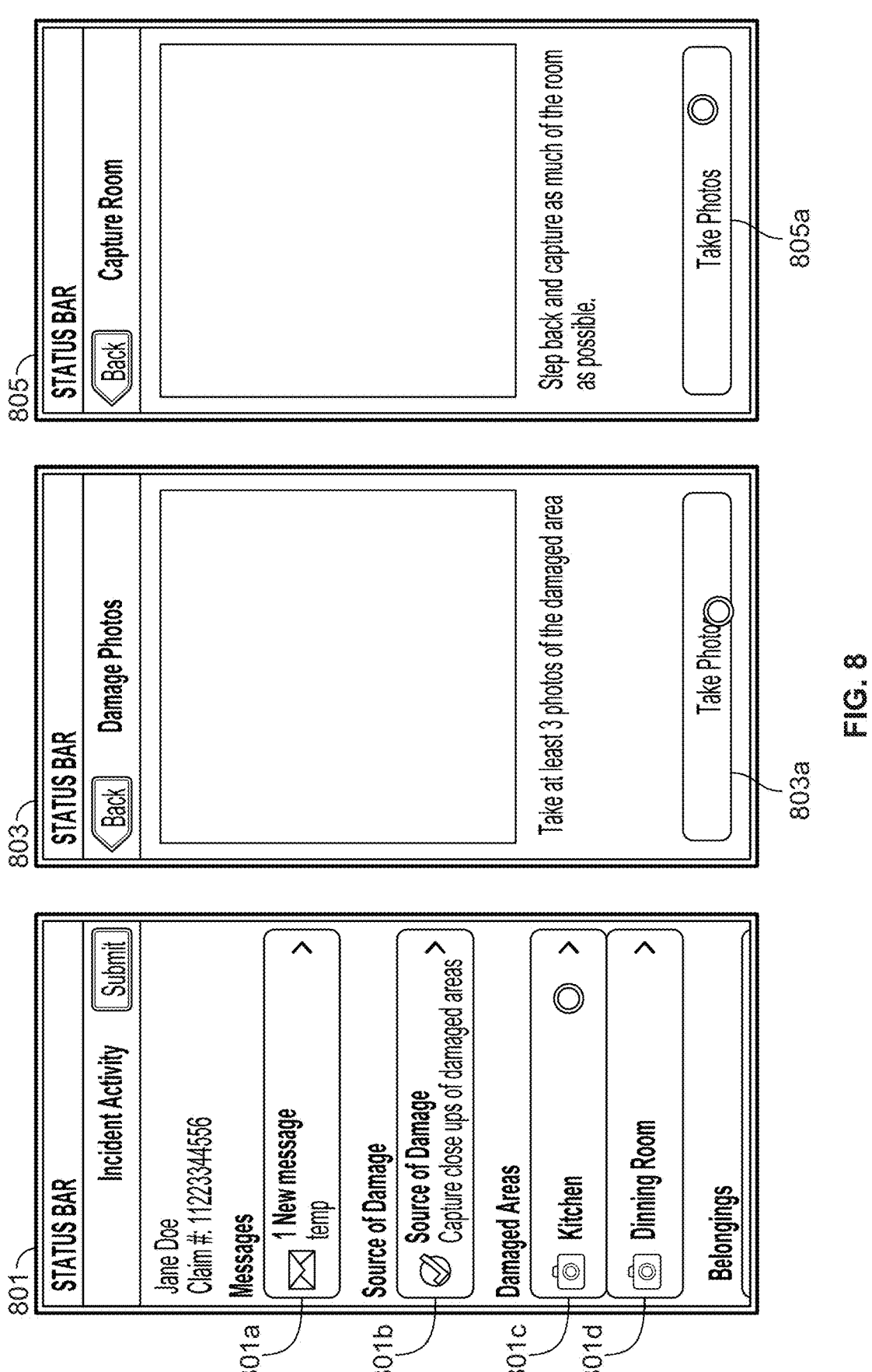

FIG. 8 illustrates screens 801, 803, and 805. Screen 801 displays an updated Incident Activity screen 601. After server 101 has received the images of the source of damage, screen 801 may be displayed to the user with the indication that the user has provided the source of damage (e.g., the check mark in Source of Damage button 801*b*). The user may proceed to provide images of the damaged areas (in this case, by selecting Kitchen button 801*c* as highlighted). When the user selects Kitchen button 801*c*, mobile device may display screen 803 to provide the user with instructions for capturing images of the property damage (e.g., damage photos). As shown in screen 803, the user may be prompted with instructions (e.g., "Take at least 3 photos of the damaged area"). Once the user has understood the instructions, he may select the Take Photo button 803*a*.

The selection of button 803*a* may prompt the mobile device to display screens similar those shown in FIG. 7. The mobile device may, first, display a screen similar to screen 701*a* to enable the user to capture damage photos. After the user captures the damage photos, the mobile device may display a screen similar to screen 703, so the user may review the damage photo. When the user elects to use the photo, the mobile device may display a screen similar to screen 705 allowing the user to add captions, take another photo, or continue. This process may repeat until the user has satisfied the provided instructions (e.g., taken at least 3 photos of the damaged area). Each image captured at the mobile device may be transferred to server 101 for storage and analysis.

The mobile device may, next, display screen 805. Screen 805 may provide instructions to the user for capturing images of a room where damage occurred (e.g., "Step back and capture as much of the room as possible."). After viewing the instructions on screen 805, the user may select the Take Photos button 805*a*. Thereafter, the user mobile device may again display the screens shown in FIG. 7 and described above to enable the user to capture, review, and transfer images of the room. Server 101 may receive the images and create blueprint or model of the room using the autostitch module described above.

As server 101 receives images from the mobile device it may store the images in memory 115. Memory 115 may store (e.g., in database 121) various images of properties and items. The images may include those received from users via mobile devices or from other sources (e.g., websites, inputted by insurance company, etc.). Each of the images may be stored in database 121 and catalogued with descriptors (e.g., description of the item, price, cause of damage if any, condition of the item, etc.). Server 101 may also include an image recognition module which may be able to compare received images to those images stored in database 121 to automatically recognize the received images. For example, a user may capture a photo of a door with her mobile device and transfer the image to server 101. Server 101 may use the image recognition module to compare the received image to the repository of images stored in database 121. In some aspects, server 101 may utilize descriptions provided by the user to narrow the search in database 121 (e.g., if the user adds a caption with "door" included, the image recognition module may narrow its search to images associated with the descriptor "door"). In certain aspects, the image recognition module may identify doors with similar types of damage (e.g., visually similar damages, damage occurring from same type of source, etc.) and may provide automatic estimates for the damage based on previous estimates for the stored doors with similar damage (e.g., a door with similar damage stored in database 121 cost $200 to repair, so provide an estimate of $200 for the received image displaying similar damage to a similar door).

The image recognition module may be able to automatically tag an image so that it is stored in database with other descriptors (e.g., image displays a door, door is made of X materials, the door's dimensions are 8 feet by 4 feet, etc.). Providing the various descriptors and categories may allow server 101 to more easily retrieve pertinent images by particular categories from database 121. For instance, server 101 may be able to sort doors stored in database 121 by dimensions to identify similarly sized doors, then by types of damage to find a door that was damaged by fire, etc. Server 101 may keep narrowing its search until it identifies an item most similar to that displayed in a received image.

Database 121 may allow for smart storage to prioritize what an insurance employee (e.g., adjuster) views first. For example, server 101 may first display the source of damage or the entire scene of the room first to provide the adjuster with perspective prior to viewing the damaged items. The image recognition module may be able to separate an item shown in an image for content, thereby providing the adjuster with a more in-depth view of the damaged item. In some aspects, server 101 may create a list of items identified in an image of a room received from the mobile device In some aspects, server 101 may create a list of items identified in an image of a room received from the mobile device. The image recognition module may identify the items in images of a room (e.g., not only the damaged items submitted by the user, but other items located in the room) and store the list with an associated user's profile in memory 115 (e.g., in database 121). In certain aspects, the user may aid the server 101 or adjuster in tagging various items in an image (e.g., via telephone, communicating through the Application, etc.). The images may be stored in memory 115 and used by the insurance company for various reasons (e.g., fraud detection in subsequent claims, identifying uninsured items for which to offer insurance, store in the image repository for later comparison, etc.). In some aspects, server 101 may also identify other properties displayed in the received images that may benefit from the insurance company. For instance, a user may capture photos of the outside of her house after damage by a flood, and there may be another damaged house displayed in the background of the image. The image recognition module may identify the damage and alert an insurance employee at a workbench. The insurance employee or server 101 may utilize this information along with other information received from sensors at the mobile device to determine the damaged house's location and offer insurance, offer to dispatch assistance to the home (e.g., plumber, electrician), etc. Similarly, if a catastrophe (e.g., flood, fire, etc.) were to occur, the mobile device may automatically push notifications to the Application asking whether users in the catastrophe zone would like to use the Application to submit a property claim. Likewise, server 101 may perform mitigation dispatch to a user's residence using image recognition module. For example, server 101 (or, e.g., an insurance employee) may identify that there is significant water damage in a submitted video or photo (e.g., server 101 may recognize that a pipe is spewing water, moisture in the room, etc.) and automatically generate a message to send out a mitigation vendor (e.g., plumber) to the user's location.

In some aspects, a user may use the Application to submit FNOL. For instance, the user may take a photo of damage when it first occurs. Server 101 may receive the photo and recognize the damage using its image recognition module. Server 101 may be able to automatically display the information to the appropriate insurance adjuster to handle the claim (e.g., via workbench). For example, server 101 may analyze a photo and recognize that there is water damage in a kitchen. The claim may then be forwarded to the adjuster who has best handled similar situations (e.g., provided most accurate assessments for situations involving water damage to a room, etc.). Information about each adjusters estimate accuracy may be stored in memory 115.

Figure 9:
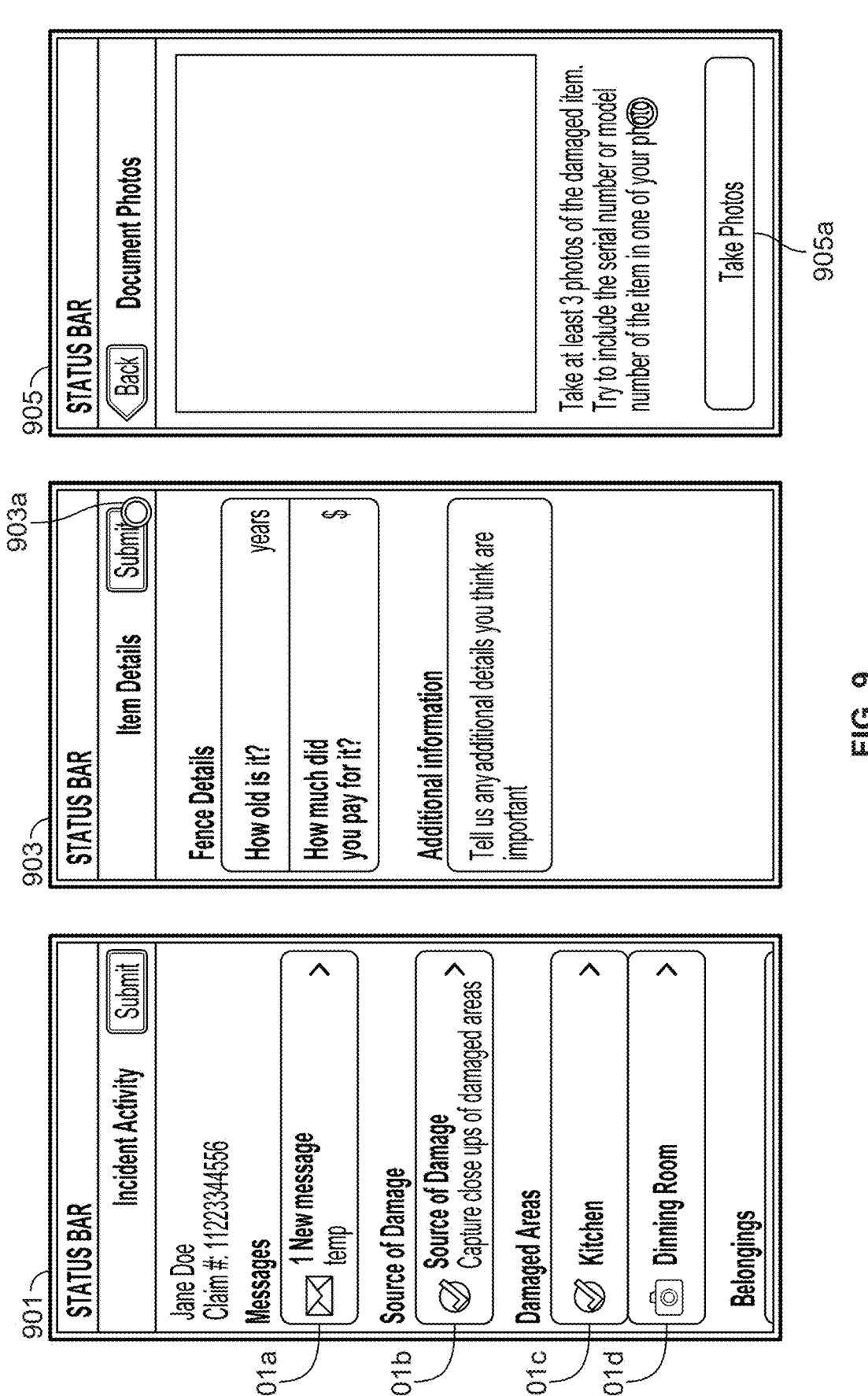
Figure 9:
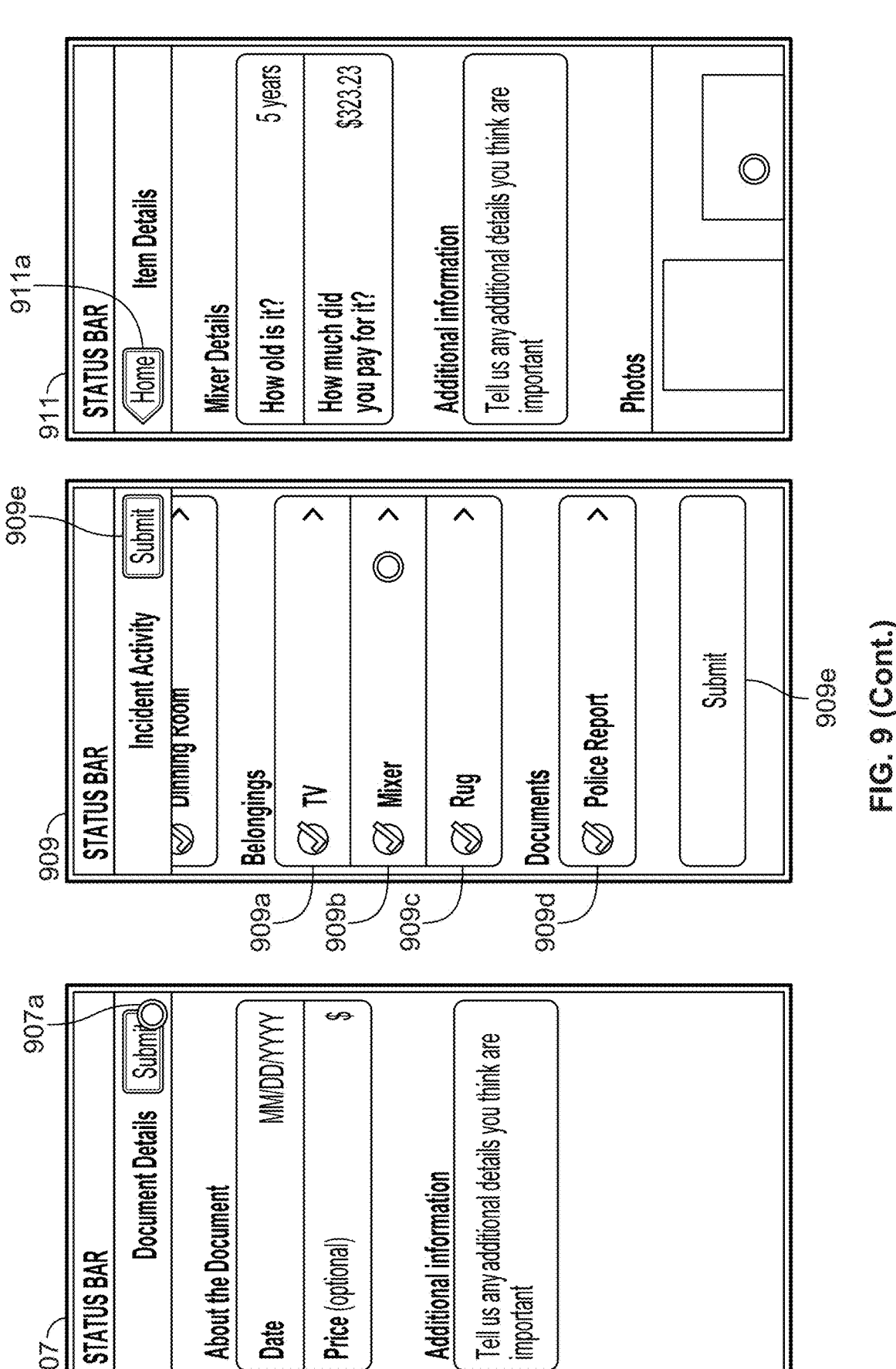
Figure 9:
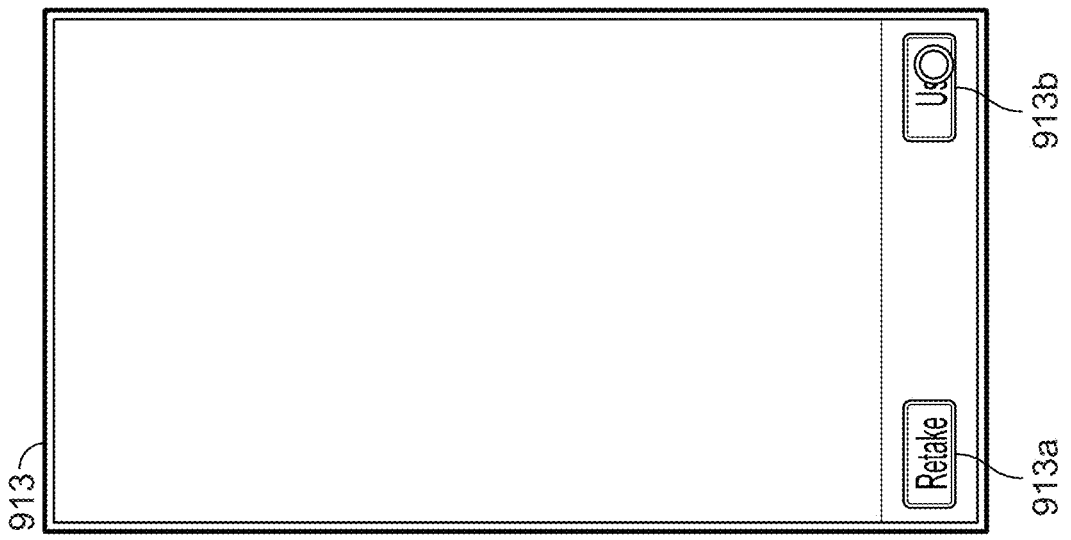

FIG. 9 illustrates screens that may be displayed by the mobile device after the user captures images of the room as requested in screen 805. Screen 901 shows an updated Incident Activity screen 601. As shown in screen 901, Source of Damage button 901*b* may display a check mark to notify the user that she has completed that step. Likewise, Kitchen button 901*c* may display a check mark after the user has captured the damage in the room and captured the scene of the room in previous screens. The user may then select Dining Room button 901*d* to perform similar steps of capturing, reviewing, and transferring images within the dining room as she did for the kitchen. The user may repeat the same process for each damage area listed in Incident Activity screen 601.

In certain aspects, after the user submits damage images of a damaged item, the mobile device may display Item Details screen 903. The user may input information about the item (e.g., how old the item is, how much the user paid for the item, additional comments, etc.). The user may hit the Submit button 903*a* as highlighted to submit the item details to server 101. Server 101 may receive and store the item details provided by the user in database 121 with the image and other descriptors.

In some aspects, the mobile device may display Document Photos screen 905. Document Photos screen 905 may display instructions for capturing images of documents (e.g., "Take at least 3 photos of the damaged item. Try to include the serial number or model number of the item in one of your photos."). The user may then select Take Photos button 905*a* to go through the process of capturing, reviewing, and transferring images via screens similar to those illustrated in FIG. 7. The user may take a photo of a document (e.g., invoice, estimate, receipt, serial number, etc.) and submit the photo to server 101. Server 101 may include a document recognition module that may be able to recognize the text in the document (e.g., via OCR recognition). The document recognition module may also put the information it recognizes from the document into a format where the text may be more easily recognized (e.g., Microsoft Word, Excel, an itemized list, etc.) and associate the text with the original photo in database 121. Server 101 may analyze the stored information to provide feedback to the user, such as providing an estimate to the user. For instance, server 101 may receive a photo of a receipt for a new dresser along with a photo of a user's damaged dresser. The document recognition module may recognize the price of the new dresser and store this information along with the image of the dresser in database 121 and associate that information with a user's profile. The server 101 (or insurance employee) may then analyze the image of the dresser and receipt for the new dresser and provide an estimate that is the amount of the new dresser provided by the user.

In some aspects, server 101 may automatically associate a receipt with the damaged item. The user may capture an image of an item (e.g., a door) and an image of a receipt. The document recognition module may recognize the document is a receipt for a door and the image recognition module may recognize that the image is of a door. Thus server 101 may associate the receipt with the door in database 121. Also, server 101 may associate received images or documents with images or documents already stored in memory 115. For instance, the user may take a photo of the receipt for a dresser when he purchases the dresser. Server 101 may store the receipt in memory 115. At some time later, the user may submit a photo of the damaged dresser. Server 101 may associate the dresser with the receipt to provide an estimate to the user (e.g., the value listed in the receipt). Similarly, server 101 may compare images with stored receipts provided by other users or third-parties to determine a replacement cost for the items displayed in the images.

Server 101 may also search web sites (e.g. via the Internet) to identify more descriptors for damaged property provided by a user. The image recognition module may identify the damaged property (e.g., a door), and the server may access web sites that are likely to sell the damaged property (e.g., web sites for a warehouse store, home improvement, etc.). Thus, server 101 may be able obtain more information about the damaged property via a retail website (e.g., price, make, model, etc.).

In certain aspects, after the user captures document images, the mobile device may display Document Details screen 907. The user may input information at screen 907 (e.g., date of the document, price of the property as displayed in the document, additional comments, etc.). Then, the user may select the Submit button 907*a* as highlighted to submit the document details to server 101 for storage and analysis as discussed above.

The mobile device may, then, display a screen such as screen 909 (e.g., an updated Incident Activity screen 601). As shown in screen 909, the user may upload images and item details for belongings (e.g., television, mixer, rug, etc.) and documents (e.g., police report, etc.). For each belonging and document, the user may undergo a similar process as described above (e.g., the user may select the button for the desired item on the incident activity screen, mobile device displays instructions for capturing images of the item, mobile device displays a camera screen for capturing images of the item, mobile device displays a review screen for captured images, mobile device displays screen(s) for allowing a user to provide additional details of the item, and the user submits the image (and any additional details) to server 101). Incident Activity screen 909 provides notifications at buttons 909*a*, 909*b*, 909*c*, and 909*d* that the user has performed the each of the requisite steps (e.g., check marks).

Figure 10:
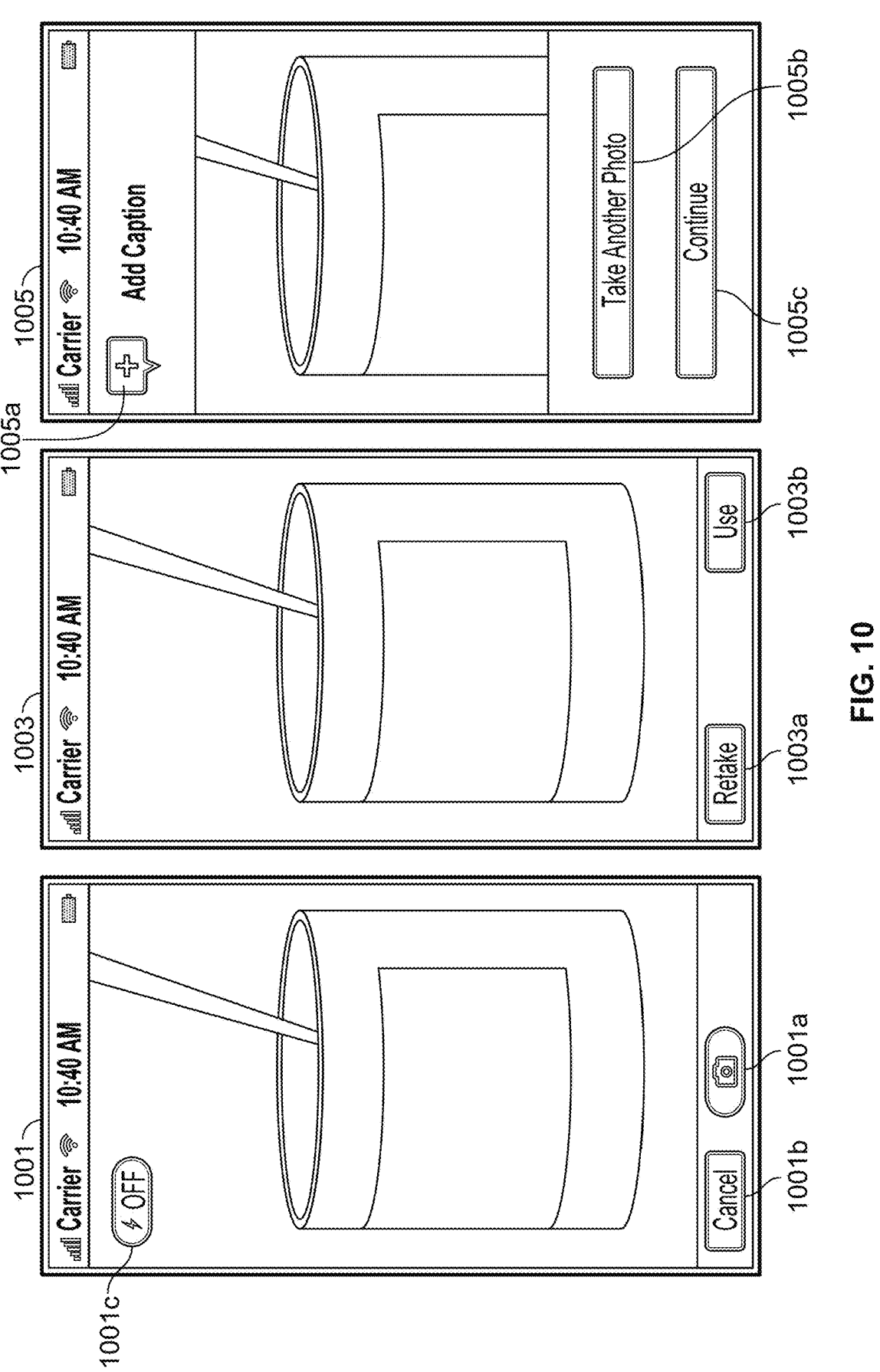
Figure 10:
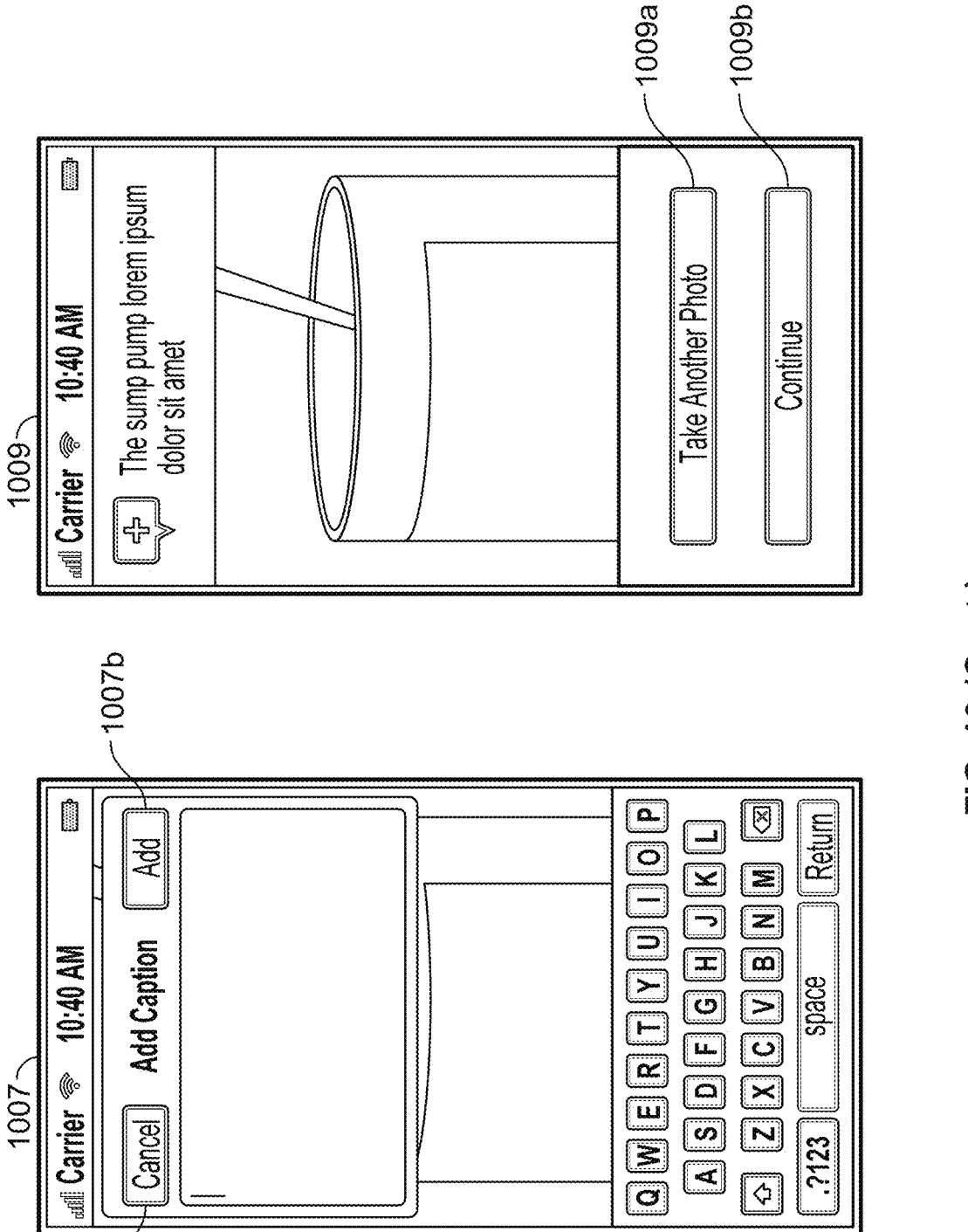
Figure 11:
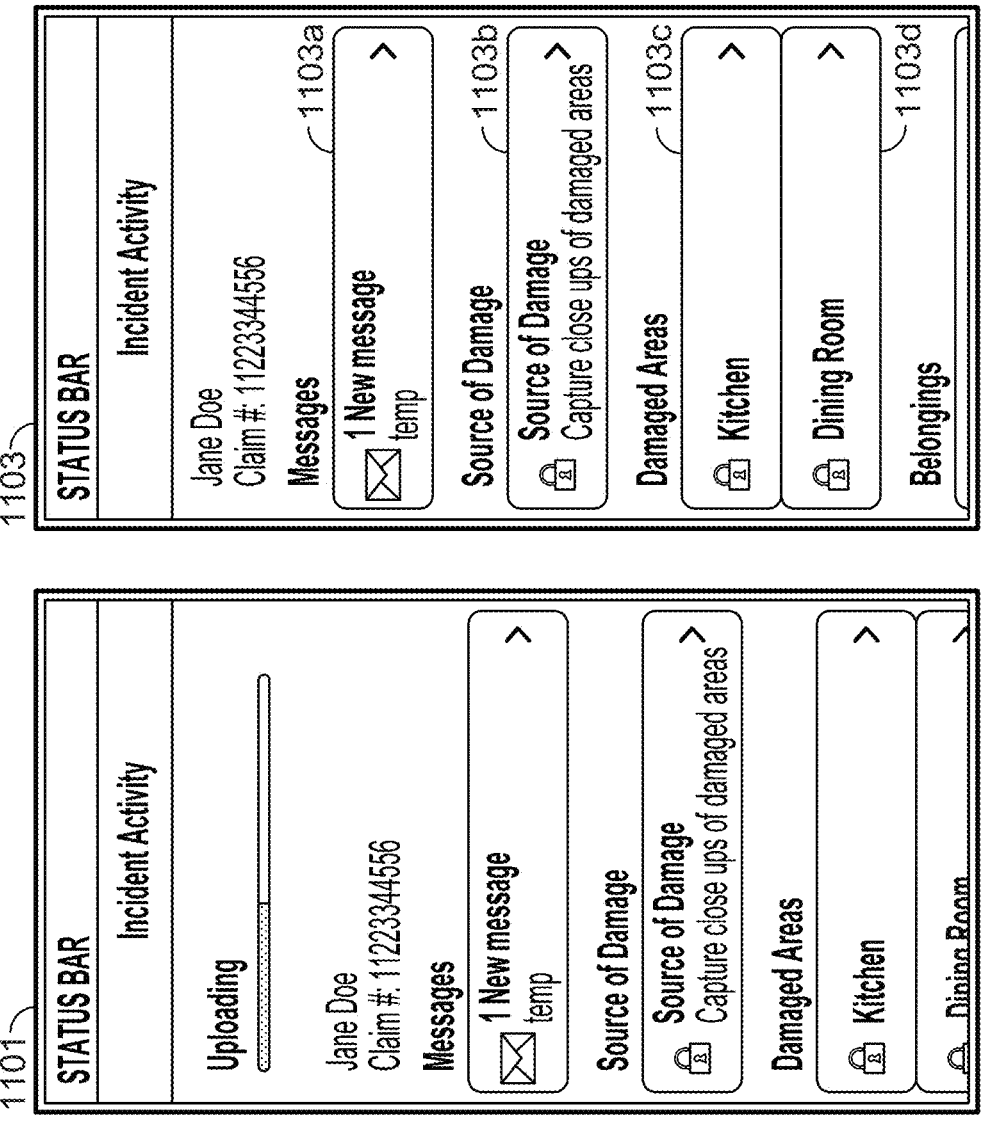

FIG. 10 provides exemplary display screens of an item (e.g. a mixer selected at button 909*b*) captured by a user using the Application. Screen 1001 displays a camera screen 701 where the mobile device's camera lens has been focused on the mixer. When the user moves the mobile device, the focus in the camera screen will change to wherever the lens is pointed (e.g., like a camera). When the user selects shutter button 1001*a*, the mobile device may display screen 1003. Screen 1003 displays the image captured at screen 1001, along with options to use the image or retake the image (e.g., as explained for screen 703). When the user selects Use button 1003*b*, the mobile device may display screen 1005 (e.g., similar to screen 705). If the user selects Add Caption button 1005*a*, the mobile device may display screen 1007. Screen 1007 includes a dropdown menu and keypad to enable the user to input additional details about the image. The user may select Cancel button 1007*a* to escape screen 1007 and return to screen 1005, or the user may select Add button 1007*b* to add a caption and proceed to screen 1009. At screen 1009, the mobile device may display the image (e.g., the mixer) with the caption inputted by the user at screen 1007. If the user selects the Take Another Photo button 1009*a*, the mobile device may return to a camera screen display 1001. If the user selects Continue button 1009*b*, the mobile device may display an Incident Activity screen (e.g., screen 909).

The user may be able to review details of items he has captured on the mobile device at Incident Activity scree 909. For example, if the user selects Mixer button 909*b* as highlighted, the mobile device may display Item Details screen 911. The user may review the details he inputted about the mixer (e.g., mixer is 5 years old, user paid $323.23 for the mixer, etc.). Screen 911 may also display the photos captured of the mixer. If the user selects a photo as highlighted, the mobile device may display screen 913, which allows the user to review the captured image (e.g., similar to screen 1003). If the user selects Retake button 913*a*, the mobile device may display camera screen 1001 so that the user may replace the image with a new image. If the user selects Use button 913, the mobile device may return to Item Details screen 911. The user may select Home button 911*a* to return to Incident Activity screen 909.

In some aspects, the data captured at the mobile device may not be transferred to server 101 until the user selects Submit button 909*e*. In such aspects, when the user selects Submit button 909*e*, the mobile device may display the screens shown in FIG. 11. First, the mobile device may display screen 1101, which may notify the user that the submitted information is being uploaded to server 101. Screen 1101 may include a graphical display of the time remaining before all of the data is uploaded to server 101. After all of the data has been uploaded to server 101, the mobile device may display screen 1103. Screen 1103 may display an Incident Activity screen with a notification (e.g., lock symbol) to the user that the data has been submitted to server 101. In some aspects, the user may not be able to further edit the data after it has been submitted to server 101.

After the server receives images at step 309, the server may determine if the images are acceptable at step 311. Server 101 may utilize the image recognition module and document recognition module to determine whether the image is acceptable (e.g., for quality, content, etc.). Server 101 may determine that the content of the image is not acceptable if, for example, the property captured in the images is unrelated to the submitted claim (e.g., submit claim for damage television, but submit a photo of a dresser). Server 101 may also analyze the images to determine if the quality is unacceptable (e.g., blurry, low light, only a portion of a scene or item, etc.). If the image is unacceptable, server 101 (or, e.g., an insurance company) may notify the user that the images are unacceptable, so that the user may return to step 307 to submit acceptable images. In some aspects, server 101 may be able to send messages to the mobile device indicating why the image was unacceptable (e.g., "The previous image was too blurry. Please hold the camera still and take another photo."). In instances where the user submits multiple images of the same property, server 101 may analyze each of the images and select the acceptable images for analysis without notifying the user that other images were unacceptable.

When a user captures video data, server 101 may be able select optimal frames in the video that best capture the reported damage using the image recognition module. The image recognition module may analyze the video and eliminate the noise so that the best frames or photos are used for the claims adjustment process. Server 101 may select optimal frames in real time or after the user has submitted the video via the mobile device. In some aspects, server 101 may provide a feedback loop to the mobile device so that the user may determine if the frames identified by the server 101 best identify the damage.

In some aspects, server 101 may use the image recognition module and document recognition module to detect fraudulent claim submissions. When server 101 receives an image of damaged property from the mobile device, server 101 may compare the image to images stored in database 121. Server 101 may compare the received image to other images received from the user to detect fraudulent behavior. For example, server 101 may store an image of property (e.g., a dresser) that the user provided at some previous time (e.g., on the date of purchase). When the user submits a claim for damage to the dresser, server 101 may automatically compare the image of the damaged dresser to the image of the new dresser to detect any inconsistencies (e.g., the new dresser had a maple finish but the damaged dresser has an oak finish). Server 101 may perform similar analyses for received documents (e.g., claim is for a dresser, but the image of the receipt is for a table). In certain aspects, server 101 may utilize data received from sensors in the mobile device to help detect fraud (e.g., user submits claim for water damage to insured house, but compass and accelerometer data indicate that the submitted images were taken at another location). In some aspects, server 101 may notify the user of the detect inconsistencies and ask the user to repeat the processes described above to submit an acceptable image.

In certain aspects, a user may be able to upload images to server 101 that were not captured using the Application, but are stored in the mobile device camera roll. Server 101 may use the image recognition module to determine whether an uploaded image has been manipulated (e.g., color changes, altered dimensions, etc.) in order to detect fraud (e.g., server 101 stores previously uploaded images of the user's insured gold earrings, but received image of damaged earrings are silver and have been altered to appear gold in the image). The ability to analyze uploaded images at server 101 may be beneficial if an insured item is stolen and the user has not previously provided an image of the item. If, for instance, a user's insured earrings are stolen, she may be able to upload another image which displays the earrings (e.g., she may upload a family photo from her camera roll in which she is wearing the earrings). Server 101 may, then, analyze the image and provide feedback to the user.

If server 101 determines that the images are acceptable, it may proceed to step 313 and provide the user with feedback (e.g., estimates, cost of repair, cost of replacement, offer for insurance, mitigation dispatch, etc.). In some aspects, server 101 may analyze received images to provide the user with hypothetical estimates. The user may capture images of property using the mobile device and upload the images to server 101. The user may then be able to provide hypothetical scenarios for response at server 101 (e.g., user may ask whether the property would be covered for a particular type of damage, how much is the user covered, what are the ten worst cases scenarios that could be potentially avoided by buying more coverage, etc.). Server 101 may respond to the hypothetical scenarios by providing feedback (e.g., offering recommendations for additional coverage, recommend preventative measures and identify best practices, identify items in the room that may require maintenance and others that don't, etc.). Server 101 may recommend contractors based on the extent of the damage. Server 101 may provide feedback by offering discounts if a user acts on a suggested action (e.g., server 101 suggests buying a new water heater and may offer an insurance discount if the user purchases a new water heater, etc.).

Figure 12:
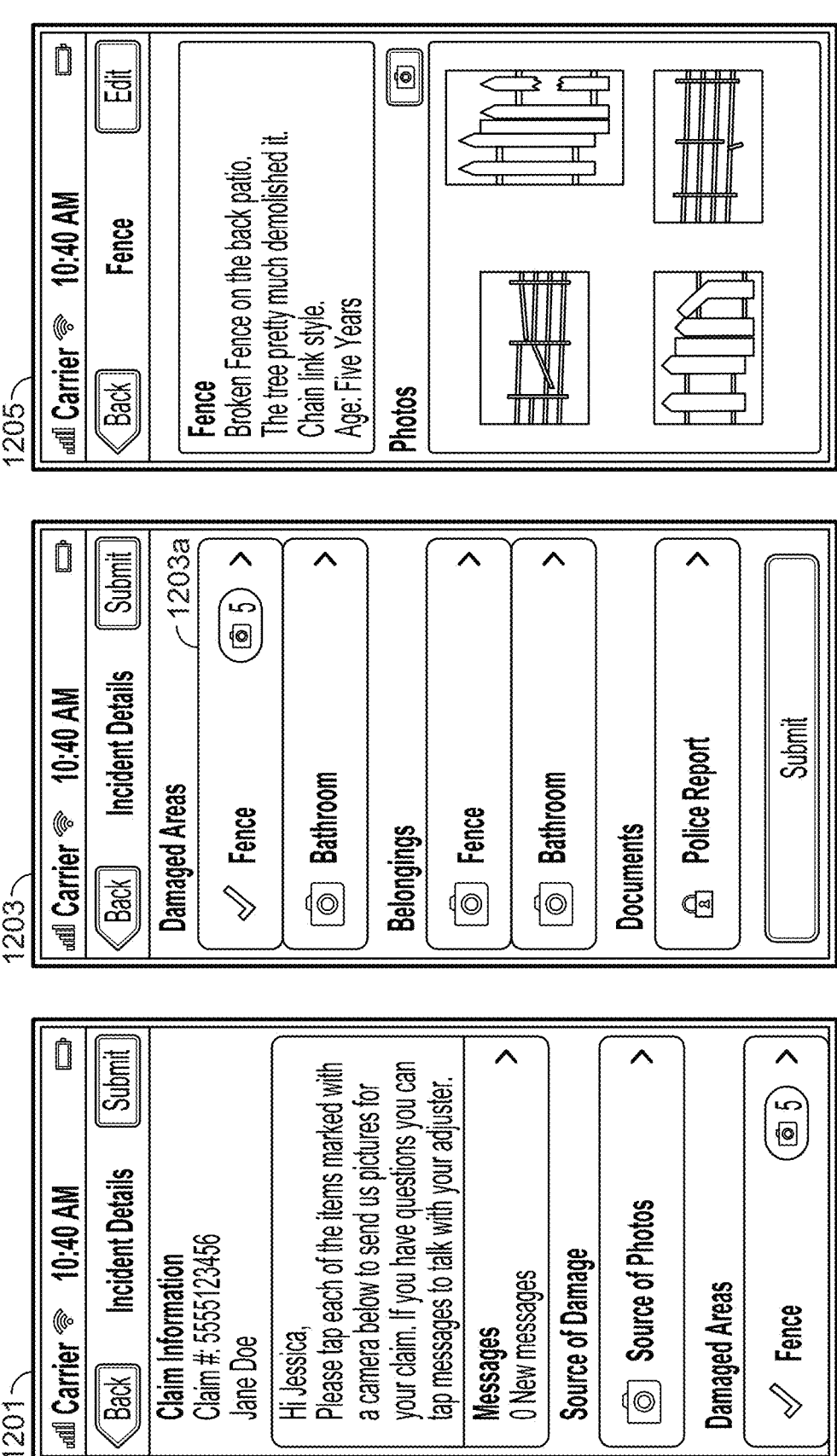
Figure 12:
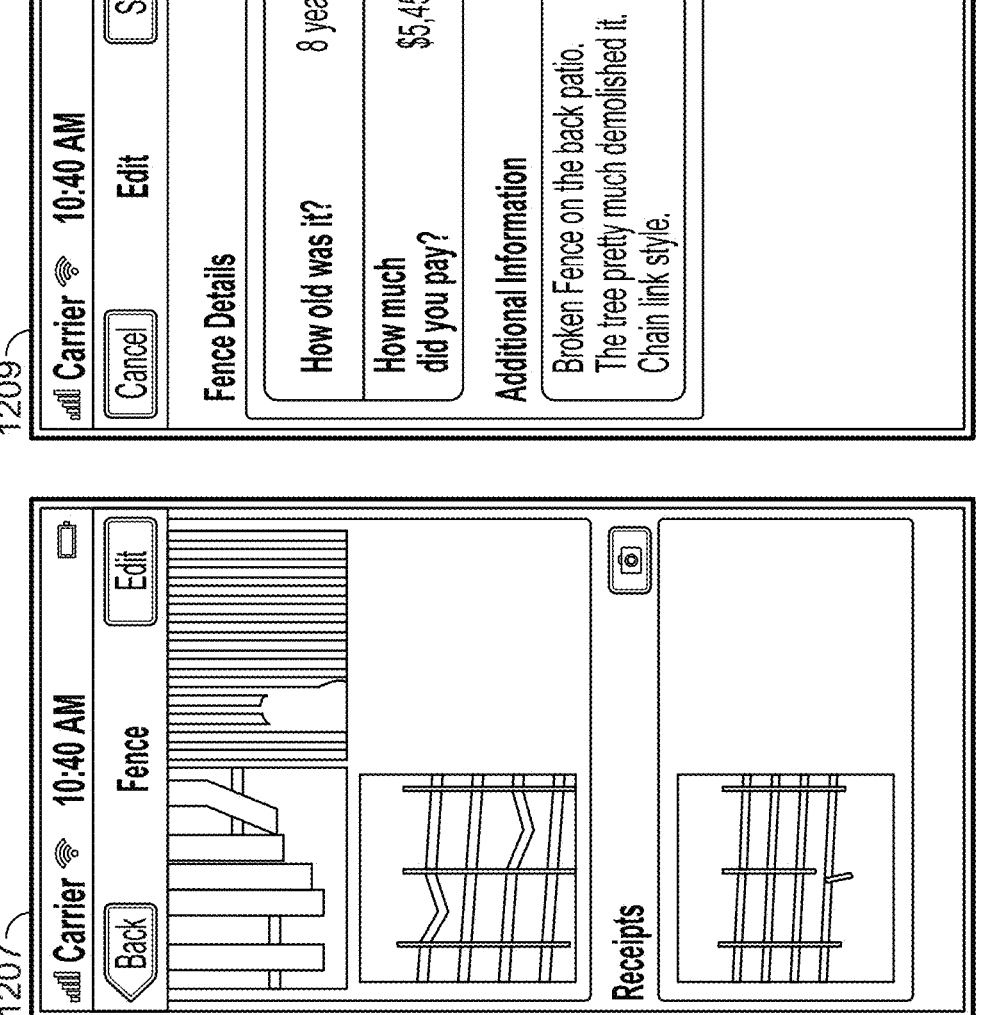

FIG. 12 illustrates exemplary screens displayed by an Application in a mobile device in accordance with aspects of the present disclosure. Screens 1201 and 1203 show an exemplary Incident Activity screen (similar to screen 601).

Screen 1201 may serve as a home screen for the user (e.g., Jane Doe) when she logs into the Application. Screen 1203 displays another view of the home screen that may be displayed when the user scrolls down the screen on the mobile device. In this example, the user may have completed the requisite steps for reporting damage to a fence, as indicated by the check mark at 1203a. The user may have captured the images using a single mobile device, or in some aspects may use more than one mobile device to capture images. Server 101 may utilize cloud synching technology to enable a user to pick up where she left of in the process from various mobile devices.

If the user selects Fence button 1203a, the mobile device may display screen 1205. The user can review the information she provided for the fence at screen 1205. She may also scroll down the screen to view screen 1207. Additionally, the mobile device may display screen 1209 so the user may review or edit the fence details she previously provided.

It should be appreciated that the actions performed at the server (e.g., server 101), described herein, may also, or in the alternative, be performed at the mobile device.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software by the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM.

What is claimed is:

1. A method comprising:
determining whether a mobile device of a user is connected to a Wi-Fi network;
in response to determining that the mobile device is connected to a network other than the Wi-Fi network, causing the mobile device to capture images of property in a first resolution and a second resolution based on instructions received from an image control module, wherein the second resolution is higher than the first resolution, wherein the network other than the Wi-Fi network has a bandwidth lower than the Wi-Fi network;
receiving, by a computing device having at least one processor, the images of property in the first resolution in real time;
determining whether the property is damaged based on the images of property in the first resolution in real time;
in response to determining that the property is damaged based on the images of property in the first resolution in real time, determining whether the mobile device is connected to the Wi-Fi network;
in response to determining that the mobile device is connected to the Wi-Fi network, receiving by the computing device the images of the property in the second resolution;
determining a type or a color of the property from the images of the property in the second resolution;
detecting fraud by the computing device, wherein the detecting includes comparing the images of the property received from the mobile device of the user to reference images of insured property stored at the computing device to determine any inconsistencies between property shown in the images of the property received from the mobile device of the user and the insured property shown in the reference images by comparing the determined type or color of the property and a type or a color of the insured property, the inconsistencies including at least an indication that the property in the images received from the mobile device of the user is not the insured property in the reference images, the detecting fraud further including:
receiving, by the computing device, sensor data from one or more sensors in the mobile device of the user;
determining, by the computing device and based on the sensor data, a location at which the images were captured; and
comparing the determined location at which the images were captured to a known location of the insured property;
generating a dimension of the property based on the images received from the mobile device;
estimating a damage to the property based on the generated dimension of the property; and
providing, by the computing device, feedback to the mobile device of the user from which the images of the property were received, the feedback including at least a result of the detecting and the estimated damage to the property.

2. The method of claim 1, wherein the image control module is located remotely from the mobile device.

3. The method of claim 1, wherein the detecting further comprises analyzing metadata received from the one or more sensors in the mobile device to combine the received images to create a scene of a room including the property.

4. The method of claim 1, wherein the reference images comprise photographs of the insured property captured at a time prior to the receiving the images.

5. The method of claim 1, wherein the feedback comprises a notification of the fraud.

6. The method of claim 1, further comprising receiving, at the computing device, descriptors about the property from the mobile device.

7. The method of claim 1, wherein the detecting fraud is further based on determining, by the image control module, whether the images of the property have been manipulated.

8. A non-transitory computer-readable storage medium having computer-executable program instructions stored thereon that when executed by a processor, cause the processor at least to:
determine whether a mobile device of a user is connected to a Wi-Fi network;
in response to determining that the mobile device is connected to a network other than the Wi-Fi network, cause the mobile device to capture images of property in a first resolution and a second resolution based on instructions received from an image control module, wherein the second resolution is higher than the first resolution, wherein the network other than the Wi-Fi network has a bandwidth lower than the Wi-Fi network;
receive, by a computing device having at least one processor, the images of property in the first resolution in real time;
determine whether the property is damaged based on the images of property in the first resolution in real time;
in response to determining that the property is damaged based on the images of property in the first resolution in real time, determine whether the mobile device is connected to the Wi-Fi network;

in response to determining that the mobile device is connected to the Wi-Fi network, receive by the computing device the images of the property in the second resolution;

determine a type or a color of the property from the images of the property in the second resolution;

detect fraud, wherein the detecting includes comparing the images of the property received from the mobile device of the user to reference images of insured property to determine any inconsistencies between insured property shown in the images of the insured property received from the mobile device of the user and the insured property shown in the reference images by comparing the determined type or color of the property and a type or a color of the insured property, the inconsistencies including at least an indication that the property in the images received from the mobile device of the user is not the insured property in the reference images, the detecting fraud further including:

receive sensor data from one or more sensors in the mobile device of the user;

determine, based on the sensor data, a location at which the images were captured; and compare the determined location at which the images were captured to a known location of the insured property;

generate a dimension of the property based on the images received from the mobile device;

estimate a damage to the property based on the generated dimension of the property; and provide, feedback to the mobile device of the user from which the images of the property were received, the feedback including at least a result of the detecting and the estimated damage to the property.

9. The non-transitory computer-readable storage medium of claim 8, wherein the image control module is located remotely from the mobile device of the user.

10. The non-transitory computer-readable storage medium of claim 8, wherein the instructions further cause the processor to analyze metadata received from the one or more sensors in the mobile device to combine the received images to create a scene of a room including the property.

11. The non-transitory computer-readable storage medium of claim 8, wherein the reference images comprise photographs of the insured property captured at a time prior to the receiving the images.

12. The non-transitory computer-readable storage medium of claim 8, wherein the feedback comprises a notification of the fraud.

13. The non-transitory computer-readable storage medium of claim 8, the instructions further cause the processor to receive descriptors about the property from the mobile device.

14. The non-transitory computer-readable storage medium of claim 8, wherein the detecting fraud is further based on determining, by the image control module, whether the images of the property have been manipulated.

15. An apparatus comprising:

a processor; and a memory storing computer-readable instructions that, when executed by the processor, cause the apparatus at least to:

determine whether a mobile device of a user is connected to a Wi-Fi network;

in response to determining that the mobile device is connected to a network other than the Wi-Fi network, cause the mobile device to capture images of property in a first resolution and a second resolution based on instructions received from an image control module, wherein the second resolution is higher than the first resolution, wherein the network other than the Wi-Fi network has a bandwidth lower than the Wi-Fi network;

receive, by a computing device having at least one processor, the images of property in the first resolution in real time;

determine whether the property is damaged based on the images of property in the first resolution in real time;

in response to determining that the property is damaged based on the images of property in the first resolution in real time, determine whether the mobile device is connected to the Wi-Fi network;

in response to determining that the mobile device is connected to the Wi-Fi network, receive by the computing device the images of the property in the second resolution;

determine a type or a color of the property from the images of the property in the second resolution;

detect fraud, wherein the detecting includes comparing the images of the property received from the mobile device of the user to reference images of insured property stored at the apparatus to determine any inconsistencies between the property shown in the images received from the mobile device of the user and the insured property shown in the reference images by comparing the determined type or color of the property and a type or a color of the insured property, the inconsistencies including at least an indication that the property in the images received from the mobile device of the user is not the insured property in the reference images, the detecting fraud further including:

receiving sensor data from one or more sensors in the mobile device of the user;

determining, based on the sensor data, a location at which the received images were captured; and comparing the determined location at which the received images were captured to a known location of the insured property;

generate a dimension of the property based on the images received from the mobile device;

estimate a damage to the property based on the generated dimension of the property; and provide feedback to the mobile device of the user from which the images were received, the feedback including at least a result of the detecting and the estimated damage to the property.

16. The apparatus of claim 15, wherein the instructions further cause the apparatus to analyze metadata received from the one or more sensors in the mobile device to combine the received images to create a scene of a room including the property.

17. The apparatus of claim 15, wherein the reference images comprise photographs of the insured property captured at a time prior to the receiving the received images.

18. The method of claim 1, wherein generating the dimension of the property further comprises:

recognizing a gap in the images of the property;

determining a gap location based on metadata associated with the images;

autostitching the images of the property to fill in the gap.

19. The method of claim 1, further comprising:

identifying an image including property having a type and a damage type visually similar to the type and a damage type in the images of the property;

estimating the damage in the images of the property based on a previous estimated damage of the property associated with the image.

20. The method of claim 1, further comprising:

storing the images in the second resolution in the mobile device when the network condition is in the first condition.

21. The method of claim 1, wherein receiving the images in the first resolution is automatically switched to receiving the images in the second resolution when the network condition changes from the first condition to the second condition.

\* \* \* \* \*